(12) United States Patent
Shizu et al.

(10) Patent No.: US 9,388,880 B2
(45) Date of Patent: Jul. 12, 2016

(54) SIMPLE PLANETARY REDUCTION GEAR

(71) Applicant: Sumitomo Heavy Industries, Ltd., Tokyo (JP)

(72) Inventors: Yoshitaka Shizu, Aichi (JP); Kazunori Hiranuma, Aichi (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/691,325

(22) Filed: Apr. 20, 2015

(65) Prior Publication Data

US 2015/0226288 A1    Aug. 13, 2015

Related U.S. Application Data

(63) Continuation of application No. PCT/JP2013/079794, filed on Nov. 1, 2013.

(30) Foreign Application Priority Data

| Nov. 5, 2012 | (JP) | 2012-244013 |
| Nov. 13, 2012 | (JP) | 2012-249749 |
| Nov. 16, 2012 | (JP) | 2012-252713 |
| Nov. 21, 2012 | (JP) | 2012-255736 |

(51) Int. Cl.
*F16H 57/04* (2010.01)
*F16H 1/36* (2006.01)
(Continued)

(52) U.S. Cl.
CPC .. *F16H 1/36* (2013.01); *E02F 9/12* (2013.01); *E02F 9/123* (2013.01); *E02F 9/128* (2013.01);
(Continued)

(58) Field of Classification Search
CPC ......... F16H 1/36; F16H 1/34; F16H 57/0479; F16H 57/0416; F16H 47/08; F16H 57/0486; F16H 57/0409; F16H 1/28; F16H 2057/085; E02F 9/123; E02F 9/128; E02F 9/202
See application file for complete search history.

(56) References Cited

U.S. PATENT DOCUMENTS 3,120,764 A * 2/1964 Berlinger, Jr. ............ F16H 1/36
475/338
3,539,035 A * 11/1970 Wolkenstein ....... F16H 57/0482
184/13.1
(Continued)

FOREIGN PATENT DOCUMENTS

| JP | 2000-240736 A | 9/2000 |
| JP | 2001-099241 A | 4/2001 |

(Continued)

OTHER PUBLICATIONS

International Search Report issued in Application No. PCT/JP2013/079794, mailed Feb. 4, 2014.

*Primary Examiner* — David J Hlavka
(74) *Attorney, Agent, or Firm* — Michael Best and Friedrich

(57) ABSTRACT

A simple planetary reduction gear includes a sun gear, a planetary gear which revolves around the sun gear and is supported by a carrier, and an internal gear with which the planetary gear internally meshes, and is used in a vertically installed state. The sun gear includes a shaft portion protruding to a load side (lower side) coaxially with a shaft center O1 of the sun gear, and the shaft portion is supported by a ball bearing which is disposed between the outer circumference of the shaft portion and the inner circumference of the carrier. Accordingly, high maintainability is secured and a problem of generation of heat is prevented.

19 Claims, 12 Drawing Sheets

(51) Int. Cl.
*F16H 1/28* (2006.01)
*E02F 9/20* (2006.01)
*E02F 9/12* (2006.01)
*F16H 1/34* (2006.01)
*F16H 57/08* (2006.01)

(52) U.S. Cl.
CPC *E02F 9/202* (2013.01); *F16H 1/28* (2013.01); *F16H 1/34* (2013.01); *F16H 57/0409* (2013.01); *F16H 57/0416* (2013.01); *F16H 57/0479* (2013.01); *F16H 57/0486* (2013.01); *F16H 57/08* (2013.01); *F16H 2057/085* (2013.01)

(56) References Cited

U.S. PATENT DOCUMENTS

| | | | | |
|---|---|---|---|---|
| 4,756,212 A | * | 7/1988 | Fuehrer | F16H 57/0479 475/159 |
| 5,643,126 A | * | 7/1997 | Hotta | F16H 57/0479 184/6.12 |
| 5,910,063 A | * | 6/1999 | Kato | F16H 57/0427 475/159 |
| 7,357,745 B2 | * | 4/2008 | Hidaka | B60K 17/105 475/159 |
| 8,641,569 B2 | | 2/2014 | Morita et al. | |
| 2003/0027681 A1 | * | 2/2003 | Kakeno | F16H 1/28 475/339 |
| 2009/0101424 A1 | * | 4/2009 | Suzuki | B60K 7/0007 180/65.51 |
| 2012/0309577 A1 | * | 12/2012 | Komaru | E02F 9/128 475/149 |
| 2013/0011233 A1 | * | 1/2013 | Watanabe | E02F 9/123 414/744.2 |
| 2013/0089400 A1 | * | 4/2013 | Uzawa | E02F 9/123 414/744.1 |
| 2013/0180809 A1 | * | 7/2013 | Yabuuchi | F16D 55/36 188/71.5 |
| 2013/0337959 A1 | * | 12/2013 | Suzuki | H02K 5/1732 475/149 |

FOREIGN PATENT DOCUMENTS

| | | |
|---|---|---|
| JP | 2002-097668 A | 4/2002 |
| JP | 2002-322673 A | 11/2002 |
| JP | 2008-232269 A | 10/2008 |
| JP | 2011-236950 A | 11/2011 |

\* cited by examiner

SIMPLE PLANETARY REDUCTION GEAR

RELATED APPLICATIONS

Priority is claimed to Japanese Patent Application No. 2012-244013, filed Nov. 5, 2012, Japanese Patent Application No. 2012-249749, filed Nov. 13, 2012, Japanese Patent Application No. 2012-252713, filed Nov. 16, 2012, and Japanese Patent Application No. 2012-255736, filed Nov. 21, 2012, and International Patent Application No. PCT/JP2013/079794, the entire content of each of which is incorporated herein by reference.

BACKGROUND

1. Technical Field

Certain embodiments of the invention relate to a simple planetary reduction gear.

2. Description of Related Art

Japanese Unexamined Patent Application Publication No. 2011-236950 discloses a swiveling apparatus of a construction machine.

The swiveling apparatus includes a simple planetary reduction gear. The simple planetary reduction gear includes a sun gear, a planetary gear which revolves around the sun gear and is supported by a carrier, and an internal gear with which the planetary gear internally meshes, and is used in a vertically installed state, that is, in a state where the shaft center of the simple planetary reduction gear is toward a vertical direction.

The sun gear of the simple planetary reduction gear is integrally and rotatably connected to a motor shaft of a motor via a spline. In the related art, in this kind of simple planetary reduction gear, two methods are suggested in the design of the spline for connecting the motor shaft and the sun gear to each other.

One design is that fitting of the spline is set with interference fitting. According to this design, the support of the sun gear can be completed only on the motor shaft side. A design, in which the sun gear is formed to be directly cut on the motor shaft, is also included in the above-described design.

Another design is that the fitting of the spline is set with clearance fitting.

SUMMARY

According to an aspect of certain embodiments of the invention, there is provided a simple planetary reduction gear including: a sun gear; a planetary gear which is supported by a carrier; and an internal gear with which the planetary gear internally meshes, in which the simple planetary reduction gear is used in a vertically installed state, the sun gear is a shaft portion which protrudes to a load side coaxially with a shaft center of the sun gear, and the shaft portion is supported by a bearing which is disposed between an outer circumference of the shaft portion and an inner circumference of the carrier.

DETAILED DESCRIPTION

In a design in which a sun gear is supported by a motor shaft, when a motor is removed in maintenance work or the like, a sun gear is disassembled in a state where the sun gear is provided on the motor shaft side, and thus, there is a problem that maintenance is not easily performed.

Meanwhile, in a design in which the sun gear is clearance-fitted to the motor shaft, a configuration in which the sun gear is supported by a reduction gear side at a specific axial direction position is required. In general, the sun gear is clamped by a snap ring, a protrusion, or the like, and thus, position regulation in the axial direction of the sun gear is performed. However, a contact portion between the snap ring or the protrusion, and the sun gear is necessarily "a metal contact with a relative rotation", and thus, generation of heat becomes a problem.

It is desirable to provide a simple planetary reduction gear capable of securing high maintainability and preventing the generation of heat.

In a simple planetary reduction gear according to certain embodiments of the invention, a sun gear includes a shaft portion which protrudes to a load side (lower side) coaxially with the shaft center of the sun gear. Moreover, the sun gear is supported by the bearing disposed between the outer circumference of the shaft portion and the inner circumference of a carrier.

According to certain embodiments of the invention, since the sun gear can remain at the reduction gear side when a motor is removed, it is possible to keep high maintainability.

Moreover, since the axial direction position of the sun gear is held so as to be rotatably supported by a bearing, it is possible to prevent generation of heat.

Hereinafter, an example of an embodiment of the invention will be described in detail with reference to drawings.

Figure 1:
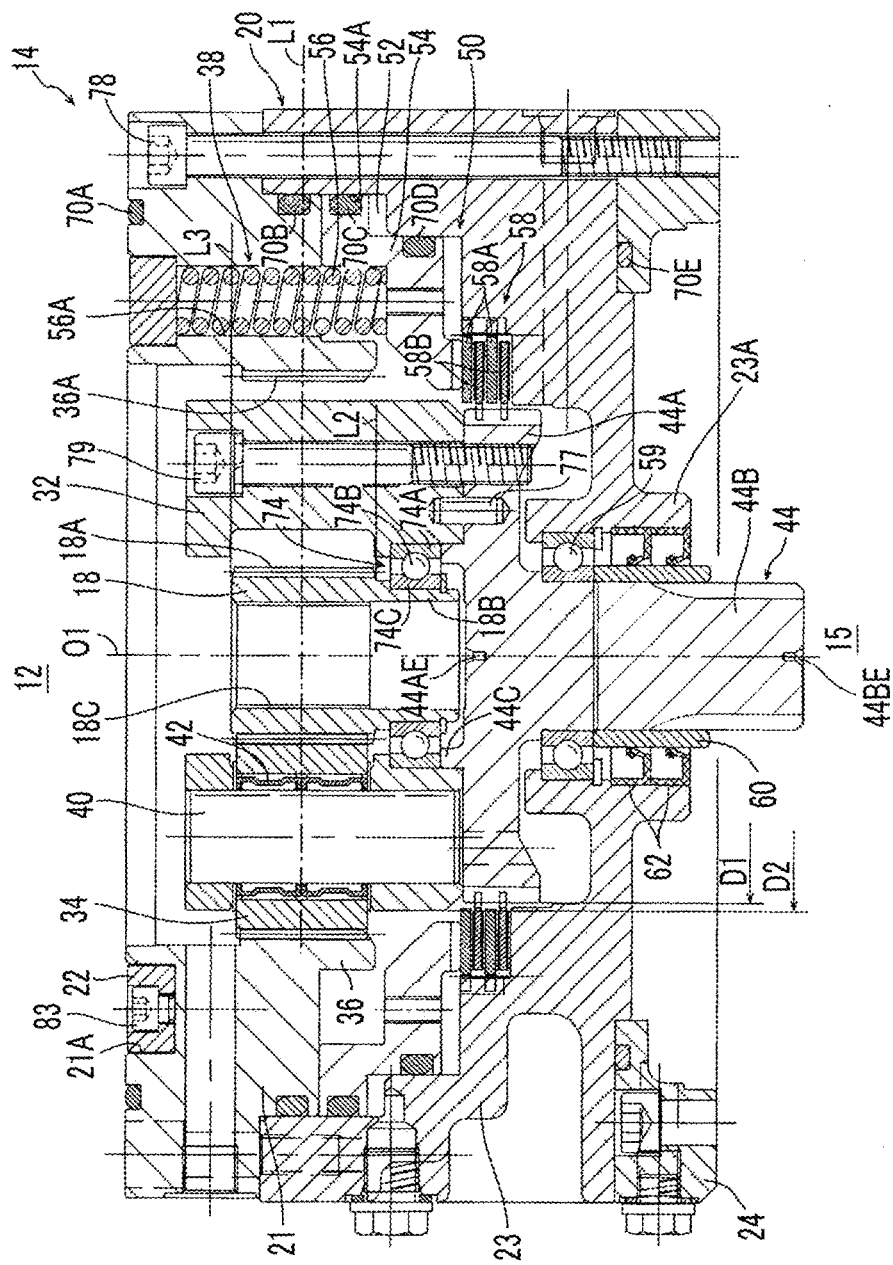
FIG. 1 is a cross-sectional view showing a configuration of a simple planetary reduction gear according to an example of an embodiment of the invention.
Figure 2:
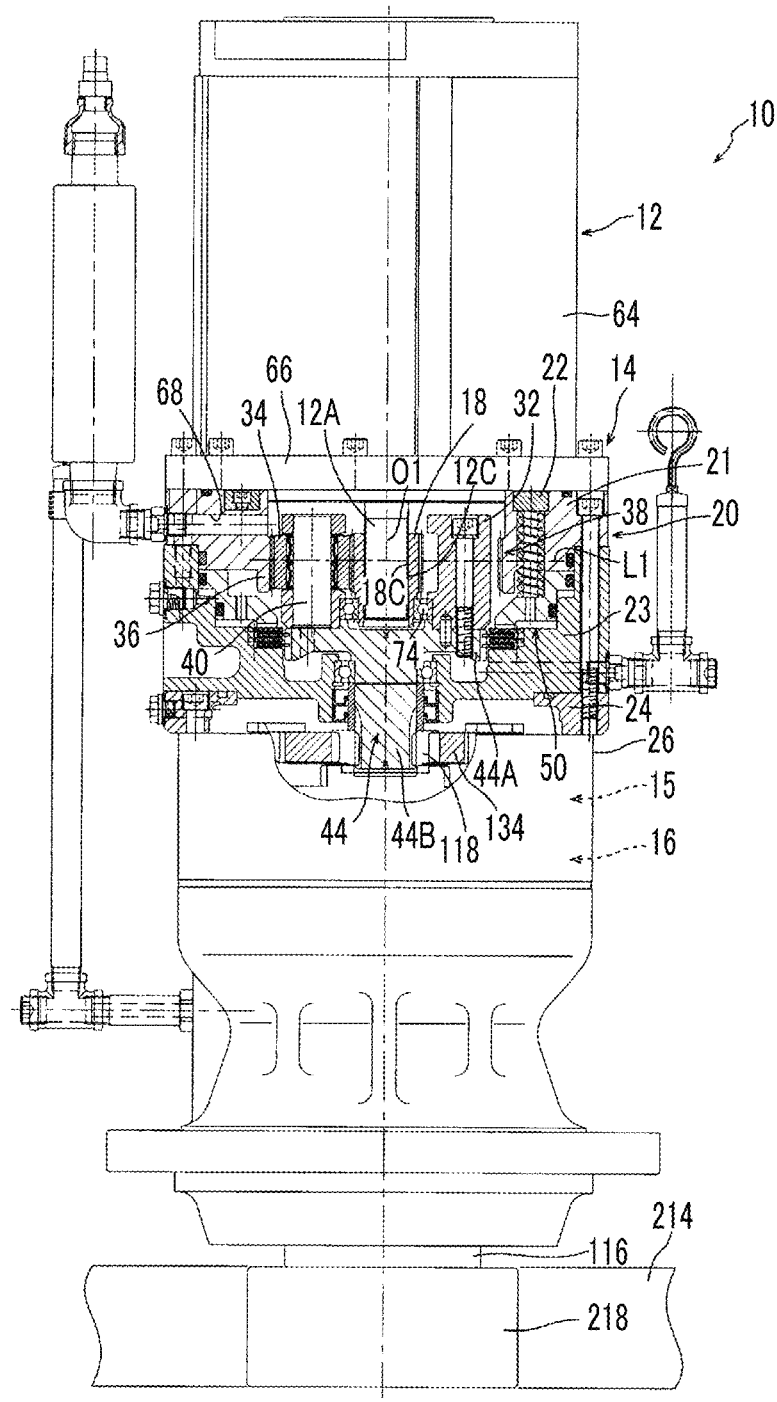
FIG. 2 is a cross-sectional view showing a drive unit of a swiveling apparatus of a construction machine into which the simple planetary reduction gear is incorporated.

FIG. 1 is a cross-sectional view showing a configuration of a (first-stage) simple planetary reduction gear according to an example of an embodiment of the invention, and FIG. 2 is a cross-sectional view showing a drive unit of a swiveling apparatus of a shovel car (construction machine) into which the simple planetary reduction gear is incorporated. In addition, FIG. 4 is an overall schematic perspective view of the shovel car into which the drive unit is incorporated.

First, an overall schematic configuration of a shovel car 200 into which a drive unit 10 is incorporated is described.

Figure 4:
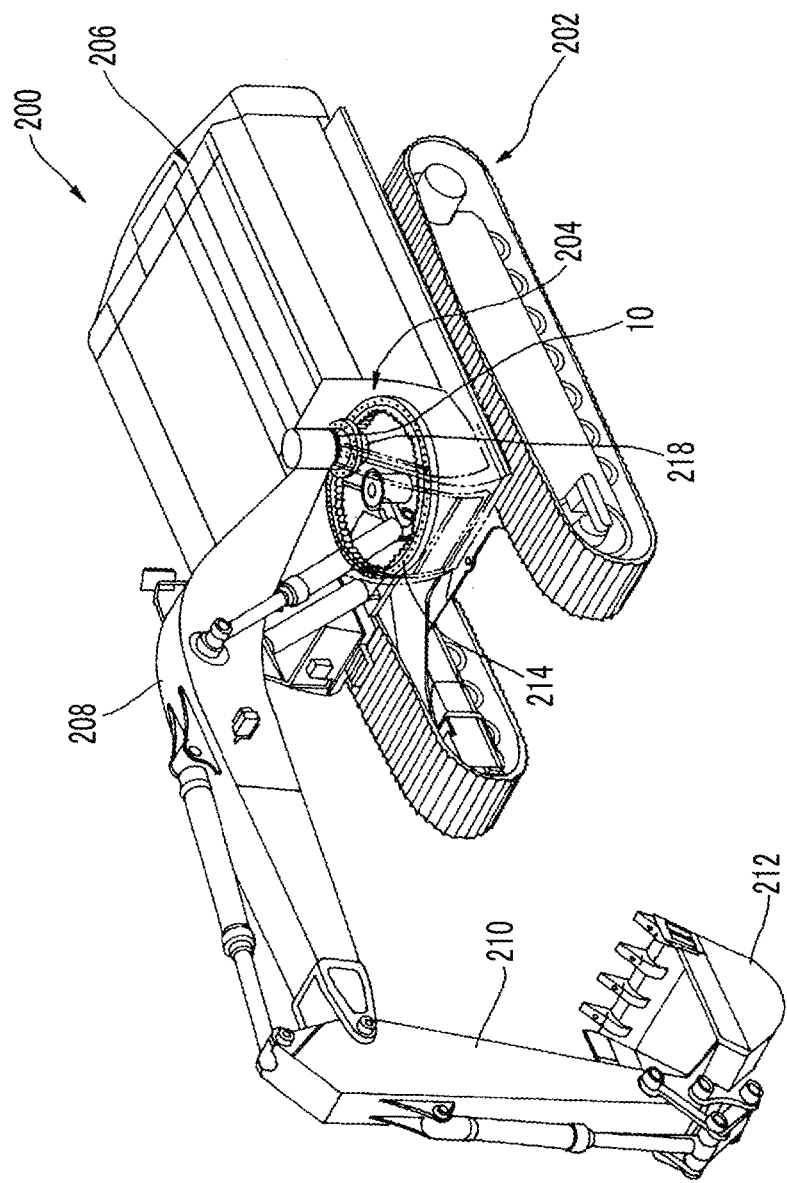
FIG. 4 is an overall schematic perspective view of a shovel car into which the drive unit is incorporated.

With reference to FIG. 4, in the shovel car 200, an upper swivel body 206 including a drive seat 204 is turnably placed on a lower travelling body (crawler) 202. A boom 208, an arm 210, and an attachment 212 are provided above the upper swivel body 206 in a cantilever state. A swivel internal gear 214 is fixed to the lower travelling body (crawler) 202, a swivel pinion 218 of a final output shaft 216 (not shown in FIG. 4) described below of a drive unit 10 attached to the upper swivel body 206 side meshes with the swivel internal gear 214, and thus, the upper swivel body 206 can be swiveled.

Next, with reference to FIG. 2, the outline of the drive unit 10 will be described.

The drive unit 10 includes a motor (drive source) 12, and (first-stage to third-stage) simple planetary reduction gears 14 to 16. A motor shaft 12A of the motor 12 is connected to a sun gear 18 of the first-stage simple planetary reduction gear 14.

In addition, hereinafter, the "first-stage simple planetary reduction gear 14" may be simply referred to as a reduction gear 14. The configuration in the vicinity of the sun gear 18 of the reduction gear 14 will be described in detail below.

The reduction gear 14 includes a simple planetary reduction mechanism 38 having the sun gear 18, a planetary gear 34 which revolves around the sun gear 18 and is supported by a carrier 32, and an internal gear 36 with which the planetary gear 34 internally meshes, in a casing 20. In the present embodiment, when the shovel car 200 is disposed on a horizontal surface, a shaft center O1 of the simple planetary reduction mechanism 38 of the reduction gear 14 is disposed so as to be coincident with a vertical direction.

That is, the reduction gear 14 is used in a vertically installed state. Here, in a narrow sense, the "use in the vertically installed state" means that the reduction gear is used in the state where the shaft center O1 of the simple planetary reduction mechanism 38 is toward the vertical direction. However, the present specification also includes the concept in a wider use aspect such as a case where the reduction gear is used in a state where "an oil level L1 intersects the shaft center O1 of the simple planetary reduction mechanism 38". That is, for example, the "use in the vertically installed state" includes a case where the shovel car 200 is used on an inclined ground in a state where the shaft center O1 of the simple planetary reduction mechanism 38 is inclined, or the like. In other words, as long as the angle between (the direction of) the shaft center O1 and the vertical direction is within 45°, any case may be included in the use in the vertically installed state.

With reference to FIG. 1, in the reduction gear 14, the internal gear 36 is integrated with (fixed to) the casing 20. That is, power is input from the sun gear 18, the planetary gear 34 revolves between the sun gear 18 and the internal gear 36, and revolution of the planetary gear 34 is extracted from the carrier 32. The planetary gear 34 is supported by a planetary pin 40 via two rows of roller bearings 42. The planetary pin 40 is pressed into the carrier 32, and thus, is integrated with the carrier 32. Accordingly, the revolution of the planetary gear 34 is transmitted to the carrier 32 via the roller bearing 42 and the planetary pin 40. In addition, the carrier 32 extends from a load side of the simple planetary reduction mechanism 38 to an anti-load side (motor 12 side) thereof, and the planetary pin 40 is supported by the (single) carrier 32 at both sides.

The carrier 32 is integrated with the output member 44 of the reduction gear 14. The output member 44 includes a disk-shaped flange portion 44A which is connected to the carrier 32, and an output shaft portion 44B which extends from the center in the radial direction of the flange portion 44A to the load side (lower side). The known second-stage simple planetary reduction gear 15 and third-stage simple planetary reduction gear 16 are connected to the rear stage of the simple first planetary reduction gear 14 (refer to FIG. 2).

Moreover, a brake mechanism 50 which controls the rotation of the output member 44 is provided in the reduction gear (the first-stage simple planetary reduction gear) 14. The brake mechanism 50 includes a hydraulic chamber 52 to which pressure oil is supplied from a hydraulic pump (not shown), a piston 54 which slides by the pressure oil supplied to the hydraulic chamber 52, a coil spring 56 which applies a biasing force to the piston 54, and a friction plate set 58. The friction plate set 58 alternately includes a plurality of fixed side friction plates 58A which are slidably and unrotatably incorporated with the casing 20 in the axial direction, and a plurality of rotation side friction plates 58B which are slidably and unrotatably incorporated with the flange portion 44A of the output member 44 in the axial direction.

During a normal operation (during a non-operation), the fixed side friction plates 58A and the rotation side friction plates 58B are strongly pressed by the biasing force of the coil spring 56, and thus, the brake mechanism 50 controls the rotation of the output member 44. When the pressure oil is supplied to the hydraulic chamber 52, the piston 54 moves upward to release the press-contact between the fixed side friction plates 58A and the rotation side friction plates 58B, and thus, the output member 44 can be rotated. When the rotating operation is not performed, the brake mechanism 50 can be used to reliably stop the rotation of the output member 44.

Moreover, the casing 20 of the simple first-stage planetary reduction gear 14 mainly includes a first casing body 21 which is integrated with the internal gear 36, a second casing body 22 which is fitted to a concave portion 21A formed in a ring shape on the upper surface of the first casing body 21, a third casing body 23 which is connected to the lower side of the first casing body 21, and a ring shaped fourth casing body 24 which is disposed below the third casing body 23 and serves as a bridge to connect with the second casing 26 (FIG. 2).

Internal teeth 36A of the internal gear 36 is formed on the inner circumference of the first casing body 21, and spring holes 56A which accommodate the coil springs 56 of the brake mechanism 50 are formed at a plurality of locations in the circumferential direction. The second casing body 22 is formed in a ring shape which is fitted to the concave portion 21A, and closes the opening portion of the spring hole 56A which accommodates the coil spring 56. A portion of the inner circumference of the third casing body 23 configures a cylinder surface 54A of the piston 54 of the brake mechanism 50. The third casing body 23 continues up to the load side surface of the first-stage simple planetary reduction gear 14, and includes a cylindrical pipe portion 23A at the center of the load side surface. The output shaft portion 44B of the output member 44 protrudes to the outside (to the second-stage simple planetary reduction gear 15 side) of the casing from the cylindrical pipe portion 23A. A bearing 59 and a bushing 60 are press-fitted to the outer circumference of the output shaft portion 44B of the output member 44, and two oil seals 62 are disposed to be arranged between the bushing 60 and the cylindrical pipe portion 23A. In addition, the side surface (also used for the cover of the reduction gear 14) of the motor 12 side of the simple planetary reduction gear 14 is closed by a cover body 66 of a motor casing 64.

The first casing body 21, the third casing body 23, and the fourth casing body 24 are fixed by bolts 78. The second casing body 22 is fixed by bolts 83.

In addition, a reference numeral 68 indicates an air vent hole, and reference numerals 70A to 70E indicate O-rings.

The drive unit 10 includes the above-described configuration, and according to the drive unit 10, the rotation of the motor shaft 12A of the motor 12 is sequentially reduced by the first-stage to third-stage simple planetary reduction gears 14 to 16, and the reduced rotation is extracted from an output shaft 116 of the third simple planetary reduction gear 16. The above-described swivel pinion 218 shown in FIG. 4 is provided on the output shaft 116 of the third-stage simple planetary reduction gear 16. The swivel pinion 218 meshes with the above described swivel internal gear 214 (fixed to the lower travelling body 202) shown in FIG. 4.

When the swivel pinion 218 of the drive unit 10 (attached to the upper swivel body 206 side) rotates, since the swivel pinion 218 revolves around the swivel internal gear 214 while meshing with the swivel internal gear 214, in the shovel car 200, it is possible to swivel the upper swivel body 206 with respect to the lower travelling body 202.

Here, the configuration in the vicinity of the sun gear 18 of the reduction gear 14 will be described.

Figure 3:
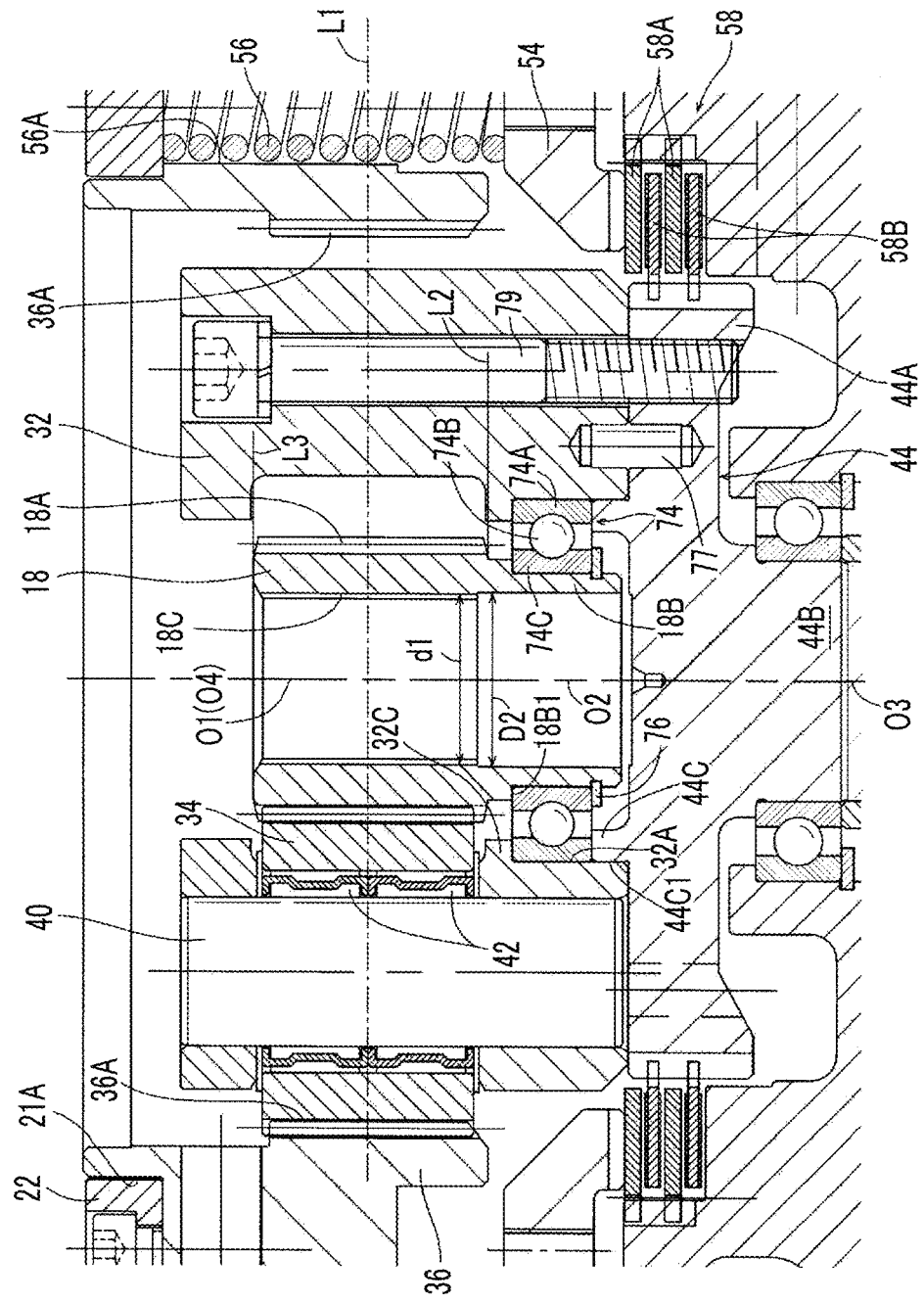
FIG. 3 is a partially enlarged cross-sectional view showing a main portion of the simple planetary reduction gear.

With reference to FIG. 3, in this embodiment, the sun gear 18, the planetary gear 34, and the internal gear 36 are all configured of helical gears.

The sun gear 18 includes a gear portion 18A, and a shaft portion 18B which is continuous to the gear portion 18A and protrudes to the load side (output side: lower side) coaxially with the shaft center O1 of the sun gear 18. The gear portion 18A and the shaft portion 18B are hollow, and a female spline 18C for connecting the motor shaft 12A is formed at the position corresponding to the inner side of the gear portion 18A. That is, the female spline 18C is formed only at the position substantially corresponding to the inner side of the gear portion 18A, and is not formed on the inner side (inner circumferential) of the shaft portion 18B. In this embodiment, the inner circumference of the shaft portion 18B has an inner diameter D2 which slightly greater than a tooth bottom circle diameter d1 of the female spline 18C.

A male spline 12C which engages with the female spline 18C is formed on the motor shaft 12A (up to the tip) (refer to FIG. 2). The male spline 12C of the motor shaft 12A and the female spline 18C of the sun gear 18 engage with each other with a "gap" therebetween, and the motor shaft 12A is connected to the sun gear 18 in a state where the motor shaft 12A reaches the inner position (of the ball bearing 74) of the shaft portion 18B. However, even when the male spline 12C of the motor shaft 12A is formed up to the tip, since the inner diameter D2 of the shaft portion 18B of the sun gear 18 is slightly greater than the tooth bottom circle diameter d1 of the female spline 18C, the male spline 12C of the motor shaft 12A does not engage with and contact with the inner side of the shaft portion 18B.

The sun gear 18 is supported by the ball bearing 74 which is disposed between the outer circumference of the shaft portion 18B and an inner circumference 32A of the carrier 32. The ball bearing 74 includes an outer ring 74A, rolling elements 74B, and an inner ring 74C.

As described above, the carrier 32 supporting the ball bearing 74 is configured of a separate member from the output member 44. Specifically, the carrier 32 and the output member 44 are connected to each other by a knock pin 77 and a bolt 79. The knock pin 77 has a temporary fixing function when the connection is performed by the bolt 79, and applies shearing stress with respect to the connection between the carrier 32 and the output member 44.

In this embodiment, using the fact that the output member 44 is a separate member from the carrier 32, the position regulation in the axial direction of the outer ring 74A of the ball bearing 74 is performed by the output member 44. That is, the flange portion 44A of the output member 44 includes an output member side protrusion 44C protruding in the axial direction, and in the carrier 32, a carrier side protrusion 32C to which the outer ring 74A of the ball bearing 74 abuts is formed to protrude in the radial direction. The outer ring 74A of the ball bearing 74 is interposed between the output member side protrusion 44C and the carrier side protrusion 32C, and thus, the position regulation in the axial direction of the outer ring 74A is performed.

An outer circumference 44C1 of the output member side protrusion 44C functions as a spigot joint portion between the outer circumference 44C1 and the inner circumference 32A of the carrier 32, and thus, causes a shaft center O3 of the output member 44 and a shaft center O2 of the carrier 32 to coincide with each other (secures O2=O3).

Moreover, in this embodiment, the inner ring 74C of the ball bearing 74 abuts a step portion 18B1 which is formed on the shaft portion 18B, and is positioned by a snap ring 76 which is fitted into the outer circumference of the shaft portion 18B.

According to the above-described configuration, in this embodiment, the sun gear 18 is supported by the ball bearing 74, and is completely accommodated in the casing 20 of the reduction gear 14. In the casing 20, oil (lubricant) is sealed so as to reach an oil level L1 corresponding to the approximately center position in the axial direction of the sun gear 18. The oil level L1 corresponds to a position which is higher than a lower end position L2 of the gear portion 18A of the sun gear 18 and is lower than an upper end position L3 of the sun gear 18. That is, the entire ball bearing 74 is completely immersed into the oil, and approximately half (up to the oil level L1) in the axial direction of the sun gear 18 is immersed into the oil.

Here, the configuration in the vicinity of the output member 44 will be described in detail.

For example, PCT Japanese Translation Patent Publication No. 2006-527119 discloses a planetary gear reduction gear. This planetary gear reduction gear includes a planetary gear reduction mechanism which includes a sun gear, a planetary gear which revolves around the sun gear and is supported by a carrier, and an internal gear with which the planetary gear internally meshes, and includes a shaft member which is integrated with the carrier. The shaft member includes a large diameter portion and a small diameter portion. Moreover, splines for connecting a brake mechanism and an output flange to each other are formed on the large diameter portion and the small diameter portion.

As the shaft member disclosed in PCT Japanese Translation Patent Publication No. 2006-527119, when the splines are formed on portions in which the diameters are different from each other, in the related art, the splines are separately machined by different tools. Accordingly, in the related art, a relatively long time is necessary for the machining of the shaft member.

Figure 5B:
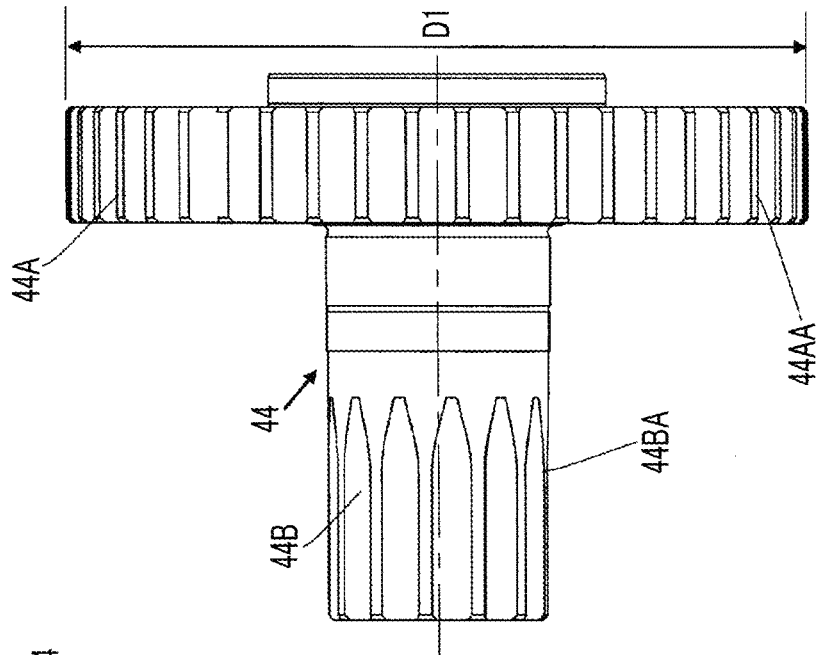
FIGS. 5A and 5B are views showing an output member of the simple planetary reduction gear.
Figure 5A:
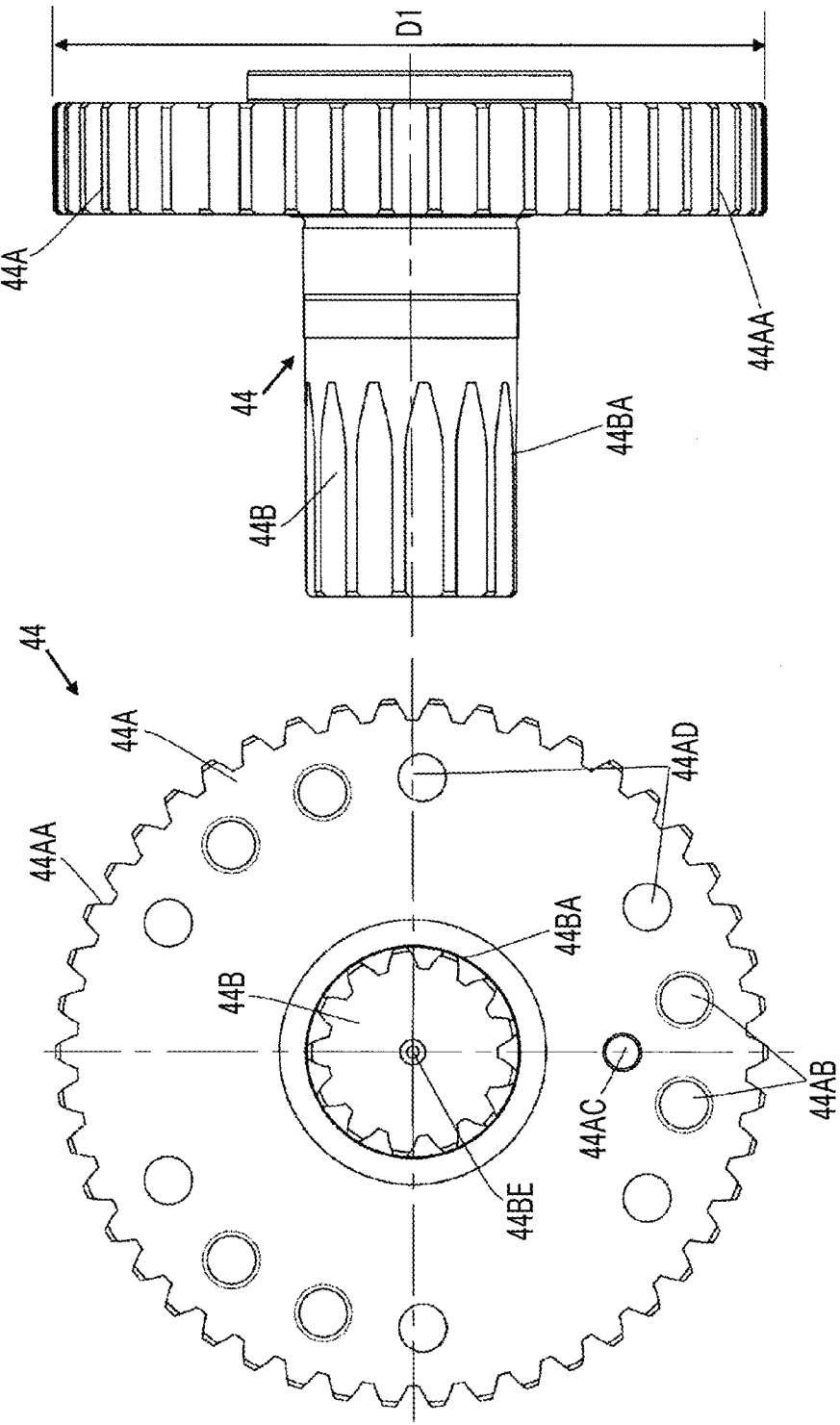

On the other hand, in the present embodiment, as described above, the output member 44 is fixed to the carrier 32 so as to be a separate member from the carrier 32. As shown in FIGS. 5A and 5B, the output member 44 includes a flange portion (large diameter portion) 44A and an output shaft portion (small diameter portion) 44B. Moreover, splines 44AA and 44BA having the same module are formed on the flange portion 44A and the output shaft portion 44B (in the axial direction). Since the diameter of the flange portion 44A is larger than the diameter of the output shaft portion 44B (even when the flange portion and the output shaft portion have the same module), the number of teeth configuring the spline 44AA which is more than the number of teeth of the output shaft portion 44B are formed on the flange portion 44A, and it is possible to control the rotation of the output member 44 at the flange portion 44A by a smaller force than the force required in the output shaft portion 44B. In addition, an outer diameter (length up to the tip of the spline 44AA) D1 of the flange portion 44A is smaller than the outermost diameter D2 of the carrier 32.

As shown in FIGS. 5A and 5B, bolt holes 44AB and knock pin holes 44C for connecting the flange portion 44A and the carrier 32 to each other are provided in the flange portion 44A. The concave portions are provided on the carrier 32 so as to correspond to the knock pin holes 44AC, and the knock pins 77 are fitted into the concave portions when the carrier 32 and the output member 44 are integrated with each other. The knock pin 77 has a temporary fixing function when the connection by the bolt 79 is performed, and applies shearing stress to the connection between the carrier 32 and the output member 44. Moreover, a reference numeral 44AD indicates a through hole which causes the oil to flow. Moreover, concave portions 44AE and 44BE in both ends in the axial direction of the output member 44 are provided to chuck the output member 44 to a machining apparatus when the splines 44AA and 44BA are formed.

As described above, the brake mechanism (brake) 50 is disposed on the outer circumference of the flange portion 44A. In the friction plate set 58 of the brake mechanism (brake) 50, the spline which engages with the spline 44AA of the flange portion 44A is formed on rotation side friction plate (friction plate) 58B. Accordingly, the rotation side friction plate 58B can be incorporated with (disposed on) the flange portion 44A. Moreover, in the friction plate set 58 of the brake mechanism (brake) 50, a male spline is also formed on the fixed side friction plate 58. In addition, a female spline is formed on the inner surface of the casing 20 along the axial direction in which the female spline engages with the male spline. Moreover, the male spline and the female spline are fitted to each other, and thus, the fixed side friction plate 58A can be incorporated with the casing 20.

Moreover, a second-stage sun gear 134, in which the spline engaging with the spline 44BA is provided, can be incorporated with the spline 44BA of the output shaft portion 44B. In addition, the second-stage sun gear 134 is configured to mesh with the second-stage planetary gear 118.

Next, the operation of the simple planetary reduction mechanism 38 will be described.

For example, if the sun gear 18 is supported by the motor shaft 12A, when the motor 12 is removed during the maintenance work, since the sun gear 18 is removed along with the motor (in a state where the oil drops), there is a disadvantage that the work is not easily performed. Particularly, when the sun gear 18 is a helical gear, since the motor 12 is removed while the sun gear 18 is rotated along the tooth surfaces of the helical gear and the remounting of the motor should be performed while the sun gear 18 is rotated along the tooth surfaces of the helical gear, it is significantly difficult to perform the work, and a so-called "scratch" due to collision between tooth surfaces may occur.

On the other hand, in order to solve this problem, when a method in which the sun gear 18 is connected to the motor shaft 12A in a state where the sun gear 18 is floated is adopted, it is necessary to provide a "positioning unit" for positioning the sun gear 18 at a specific position in the vertical direction. Since the positioning unit and the sun gear 18 come into a "metal contact with a relative rotation", a problem such as generation of heat occurs. Particularly, when the sun gear 18 is a helical gear, since a thrust load is generated in the sun gear 18 by the meshing between the sun gear 18 and the planetary gear 34, the disadvantage is more significant.

As a result, when the sun gear 18 is a helical gear, in the related art, even when the sun gear 18 is supported by the motor shaft 12A, and even when the sun gear 18 is incorporated with the motor shaft 12A in the state where the sun gear is floated, it is not possible to avoid occurrence of the large disadvantage.

However, according to the present embodiment, since the motor shaft 12A and the sun gear 18 are connected to each other by the male spline 12C and the female spline 18C which engage with each other with the "gap" therebetwen, it is possible to remove only the motor 12 in the state where the sun gear 18 remains in the reduction gear 14 side.

Moreover, when the motor 12 is remounted, since the state in which the sun gear 18 meshes with the planetary gear 34 is maintained, even when the sun gear 18 is a helical gear, the remounting may be performed by only making the motor 12 straightly advance in the axial direction and the male spline 12C of the motor shaft 12A and the female spline 18C of the sun gear 18 straightly engage with each other. Accordingly, since the engagement itself has the "gap", the connection is significantly simple, and scratches do not occur on the tooth surfaces of the sun gear 18 or the like.

In addition, the positioning of the sun gear 18 is performed by the ball bearing 74 which is disposed between the carrier 32 and the shaft portion 18B. Specifically, the outer ring 74A of the ball bearing 74 is interposed between the carrier side protrusion 32C and the output member side protrusion 44C, and thus, the outer ring 74A of the ball bearing 74 is positioned with respect to the carrier 32. Meanwhile, the inner ring 74C of the ball bearing 74 abuts the step portion 18B1 formed on the shaft portion 18B and is positioned by the snap ring 76 which is fitted into the outer circumference of the shaft portion 18B. Accordingly, it is possible to position the sun gear 18 in the axial direction via the outer ring 74A, the rolling element 74B, and the inner ring 74C of the ball bearing 74. Therefore, there is no concern that heat occurs due to the "metal contact with a relative rotation" between the sun gear 18 and the positioning unit.

In addition, in the present embodiment, since the sun gear 18 is configured of a helical gear, the thrust load inevitably occurs when the power is transmitted. However, in the present embodiment, it is possible to receive the thrust load by the ball bearing 74 without any problem (when either a forward rotation or a rearward rotation is performed).

Moreover, since the ball bearing 74 is completely immersed into the oil at the position below (the gear portion 18A of) the sun gear 18, it is also possible effectively prevent the generation of heat in the ball bearing 74 itself. Particularly, since the ball bearing 74 is disposed between the carrier 32 and the shaft portion 18B of the sun gear 18, (for example, compared to a case where the ball bearing 74 is disposed between the casing 20 and the shaft portion 18B), the rotation speed between the outer ring 74A and the inner ring 74C is decreased, and thus, the generation of heat is decreased, and the life can be also increased.

Moreover, since the ball bearing 74 is disposed in the carrier 32 to be substantially integrated with the planetary pin 40 supporting the planetary gear 34 (compared to a case where the ball bearing 74 is disposed in the casing 20), the shaft center O4 in the revolution of the planetary gear 34 and the shaft center O1 of the sun gear 18 (both centers O1 and O4 are the same as the shaft center O2 of the carrier 32 in the design), and it is possible to maintain preferable meshing between the sun gear 18 and the planetary gear 34.

In addition, the carrier 32 and the output member 44 are separate members from each other, the position regulation in the axial direction of the outer ring 74A of the ball bearing 74 is performed by the output member 44, and thus, a separate component for positioning the ball bearing 74 is not required.

In addition, the output member 44 includes the output member side protrusion 44C protruding in the axial direction, the position regulation in the axial direction of the outer ring 74A of the ball bearing 74 is performed by the output member side protrusion 44C, the outer circumstance of the output member side protrusion 44C is used as the spigot joint portion between the inner circumference 32A of the carrier 32 and the output member side protrusion 44C, and thus, it is possible to simultaneously perform the positioning in the axial direction and the shaft centering in the radial direction.

In addition, the gear portion 18A and the shaft portion 18B of the sun gear 18 are hollow, the motor shaft 12A can be inserted into the inner side of the shaft portion 18B over the inner side of the gear portion 18A, and thus, it is possible to flexibly correspond with respect to the length of the motor shaft 12A. Here, even when the female spline 18C for connecting the sun gear 18 and the motor shaft 12A to each other is formed inside the gear portion 18A of the sun gear 18, the female spline (18C) is not formed inside the shaft portion 18B. Accordingly, even when the motor shaft 12A is long, the motor shaft 12A and the inner circumference of the shaft portion 18B do not interfere with each other.

In addition, in certain embodiments of the invention, when the sun gear 18 (planetary gear 34 and the internal gear 36) is a helical gear, it is possible to obtain particularly remarkable effects. However, certain embodiments of the invention can be also applied to a case where the sun gear is a gear other than the helical gear, for example, a spur gear, and also in this case, the same effects can be obtained.

Moreover, in certain embodiments of the invention, the carrier and the output member are not necessarily separate members from each other, and may be one member. Even when the position regulation of the bearing supporting the sun gear is performed by any method, the method is not limited to the above-described example, and for example, the position regulation of the bearing may be performed by a snap ring or the like. The kind of the bearing is not limited to the ball bearing, and for example, the bearing may be a roller bearing.

In addition, the motor shaft is not necessarily inserted into the inner portion of the shaft portion, and for example, the motor shaft may be inserted into only the portion of the gear portion of the sun gear. In this case, the portion of the shaft portion is not necessarily hollow, and may be solid.

In addition, in the above-described embodiment, the connection between the motor shaft and the sun gear is performed by the spline through the clearance fitting. However, certain embodiments of the invention are not limited to this, and for example, connection by a key may be adopted.

Moreover, the shaft inserted into the sun gear is not limited to the motor shaft, and the shaft of the drive source side may be inserted into the sun gear. For example, the shaft connected to the motor shaft may be inserted into the sun gear, and if there is the brake mechanism between the motor and the reduction gear, or the like, the output shaft of the brake mechanism or the like may be inserted into the sun gear.

Next, a manufacturing method of the simple planetary reduction gear 14 will be described.

First, components such as the sun gear 18, the planetary gear 34, the internal gear 36, the carrier 32, the output member 44, or the casing 20 are machined and formed. Specifically, since the shape of the carrier 32 is complicated, for example, the carrier 32 is formed by a casting process. Moreover, in the output member 44, concave portions 44AE and 44BE are formed on a columnar member which is a base, and the columnar member is chucked to the machining apparatus by the concave portions 44AE and 44BE. In addition, an intermediate member including the flange portion 44A and the output shaft portion 44B in which the splines 44A and 44B are not formed is machined by cutting or the like. In addition, the machining tool of the machining apparatus is replaced with a hob (the intermediate member may be attached to the machining apparatus including a hob shaft other than the above-described machining apparatus), the intermediate member and the hob are constantly rotated using the concave portions 44AE and 44BE, and thus, gear creation cutting is performed. In this case, in the present embodiment, since the splines 44AA and 44BA have the same module, the splines 44AA and 44BA are formed by the same hob. That is, in the state of the same chucking state with respect to the intermediate member, the splines having the same module are formed on the flange portion 44A and the output shaft portion 44B by the same tool. Accordingly, it is possible to effectively machine the output member 44 without replacement of the tool or modification of the chucking. Proper machining and formation are also performed on other components.

Next, the formed components are assembled.

First, the ball bearing 74 is assembled to the sun gear 18. In addition, the sun gear 18 and the planetary gear 34 in this state are incorporated into the carrier 32.

Next, the bearing 59 is disposed in the cylindrical pipe portion 23A of the third casing body 23. Moreover, the output shaft portion 44B of the output member 44 is attached to the third casing body 23.

Next, the friction plate set 58 is incorporated between the outside of the flange portion 44A of the output member 44 and the inside of the third casing body 23.

Next, the carrier 32, into which the sun gear 18 and the planetary gear 34 are incorporated, and the output member 44 are fixed to be integrated with each other by bolts 79.

Next, the piston 54 is incorporated along the cylinder surface 54A of the third casing body 23. Moreover, the first casing body 21 is combined to the third casing body 23 so that the internal gear 36 and the planetary gear 34 mesh with each other. In addition, the first casing body 21, the third casing body 23, and the fourth casing body 24 are fixed by the bolt 78.

Next, the coil spring 56 is disposed in the spring hole 56A. Moreover, the second casing body 22 is disposed in the concave portion 21A and is fixed by the bolt 79.

In addition, when the drive unit 10 is assembled, the third-step simple planetary reduction gear 16, the second-step simple planetary reduction gear 15, the first-step simple planetary reduction gear 14 are assembled in this order from the lower side of the drive unit 10, and finally, the motor 12 is incorporated (thereafter, oil is introduced into the drive unit 10).

In the present embodiment, the output member 44 is a separate member from the carrier 32. Accordingly, the output member 44 is not limited by the shape dimension of the carrier 32. That is, when the output member 44 and the carrier 32 are integrally formed, it is necessary to design the diameter of the flange portion 44A so that the tool (hob or the like) for forming the splines 44AA and 44BA does not interfere with the carrier 32A. However, since the output member 44 and the carrier 32 are separate members, it is possible to design the diameter of the flange portion 44A without the limitation, and it is possible to improve a degree of freedom in the design (for example, the difference in the diameters may be not be increased when the axial distance between the flange portion and the output shaft portion is extremely short, and when the axial distance between the flange portion and the output shaft portion is relatively long, the difference in the diameters may be increased or may be decreased). Simultaneously, it is possible to select a machining unit suitable for each of the carrier 32 and the output member 44. Accordingly, with respect to each of the carrier 32 and the output member 44, optimization in the functional and manufacturing aspects can be obtained. In addition, in the present embodiment, the materials and qualities of the carrier 32 and the output member 44 are not particularly limited. However, from the viewpoint of the optimization, the materials and qualities different from each other may be used.

Moreover, in the present embodiment, the rotation side friction plate 58B is disposed in the spline 44AA of the flange portion 44A of the output member 44 which is a separate member from the carrier 32, and the outer diameter D1 of the flange portion 44A is smaller than the outermost diameter D2 of the carrier 32. That is, in the present embodiment, compared to the configuration (configuration in which the carrier is integrally formed to the output shaft portion, and thus, in the relationship between the outer diameter of the flange portion and the outer diameter of the carrier, the outer diameter of the flange portion is larger than the outermost diameter of the carrier) shown in PCT Japanese Translation Patent Publication No. 2006-527119, it is possible to decrease the outer diameter of the friction plate set 58 including the rotation side friction plate 58B without the influence of the outer diameter of the carrier 32. Here, the amount of the generation of heat in the reduction gear is likely to be increased when an agitation region of the oil introduced into the reduction gear is wider. Accordingly, compared to the configuration shown in PCT Japanese Translation Patent Publication No. 2006-527119, it is possible to decrease the agitation region of the oil by decreasing the outer diameter of the friction plate set 58, and thus, it is possible to prevent the amount of the generation of heat from being increased.

In addition, in the present embodiment, the splines 44AA and 44BA having the same module are formed on the flange portion 44A and the output shaft portion 44B. Accordingly, it is possible to machine each of the flange portion 44A and the output shaft portion 44B of the output member 44 through the same machining process using the same tool. That is, it is possible to decrease the machining time of the output member 44 without replacing the tool. Moreover, since the diameter of the flange portion 44A is larger than the diameter of the output shaft portion 44B, it is possible to reliably control the power transmitted from the output shaft portion 44B by the brake mechanism 50 of the flange portion 44A.

The structure in the vicinity of the shaft member in the present embodiment or the manufacturing method thereof can be configured as follows.

(A1) A planetary reduction gear including a planetary reduction mechanism may include a shaft member which is integrated with a carrier of the planetary reduction mechanism, the shaft member may include a large diameter portion and a small diameter portion, and splines having the module may be formed on the large diameter portion and the small diameter portion.

Accordingly, since it is possible to machine each of the large diameter portion and the small diameter portion of the shaft member using the same tool, it is not necessary to replace the tool, and it is possible to decrease the machining time.

(A2) In this case, the shaft member may be fixed to the carrier so as to be a separate member from the carrier.

(A3) Moreover, a friction plate of a brake is disposed in the spline of the large diameter portion, and the outer diameter of the large diameter portion may be smaller than the outermost diameter of the carrier.

(A4) A manufacturing method of the planetary reduction gear in which a planetary reduction mechanism is provided, and a shaft member including a large diameter portion and a small diameter portion is integrated with a carrier of the planetary reduction mechanism, and may include the chucking the shaft member, and forming splines having the same module on the large diameter portion and the small diameter portion by the same tool in the same chucking state.

Moreover, in the above-described embodiment, the carrier 32 and the output member 44 are separate members from each other. However, certain embodiments of the invention are not limited to this, and the carrier 32 and the output member 44 may be formed in one member. Moreover, in certain embodiments of the invention, the shaft member may not be the output member for extracting the output, and may be a member which is used for transmitting the power in the middle of the output.

Moreover, in the present embodiment, the rotation side friction plate 58B of the brake mechanism 50 is disposed in the spline 44AA of the flange portion 44A, and the outer diameter D1 of the flange portion 44A is smaller than the outermost diameter D2 of the carrier 32. However, certain embodiments of the invention are not limited to this. On the other hand, the outer diameter of the flange portion may be larger than the outermost diameter of the carrier. In this case, it is possible to increase the brake torque per one brake plate, and it is possible to decrease the number of plates of the friction plate set. In addition, not the rotation side friction plate of the brake mechanism but a mechanism (for example, a clutch mechanism or a pulley mechanism) for suppressing and controlling the rotation torque of the output member may be disposed in the spline of the flange portion. That is, the splines of the large diameter portion and the small diameter portion being used to connect what kind of member is not limited.

Moreover, in the above-described embodiment, the machining of the output member (shaft member) 44 is performed in the same chucking state. However, certain embodiments of the invention are not limited to this, and the machining may be performed so that the chucking state is changed.

In addition, the above-described embodiment relates the simple planetary reduction gear in which the planetary gear reduction gear includes the simple planetary gear. However, certain embodiments of the invention are not limited to this and may be widely applied to an apparatus which includes the reduction mechanism having the planetary gear.

Figure 6:
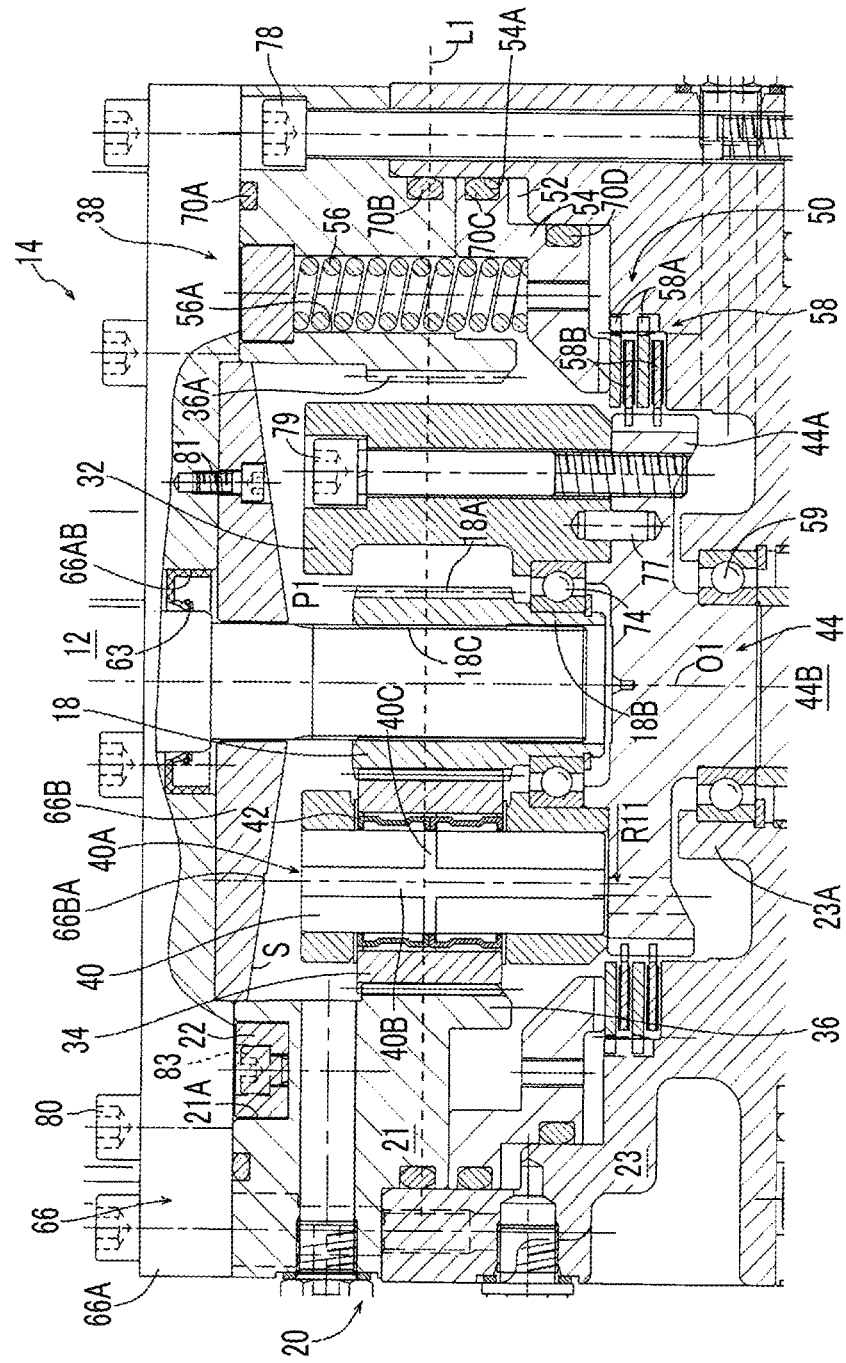
FIG. 6 is a cross-sectional view which shows a modification example of the simple planetary reduction gear and is equivalent to FIG. 1.
Figure 7:
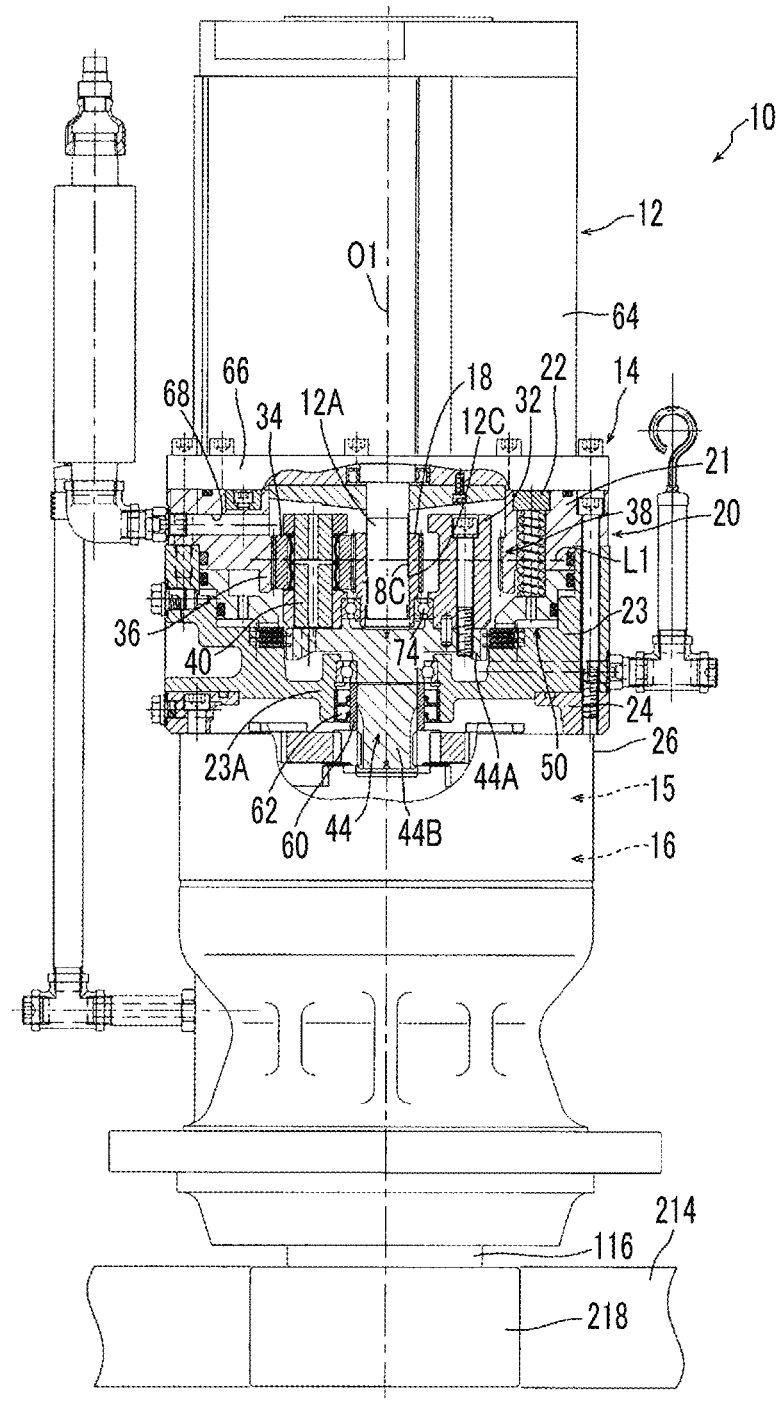
FIG. 7 is a cross-sectional view showing a drive unit of the simple planetary reduction gear of FIG. 6.
Figure 8:
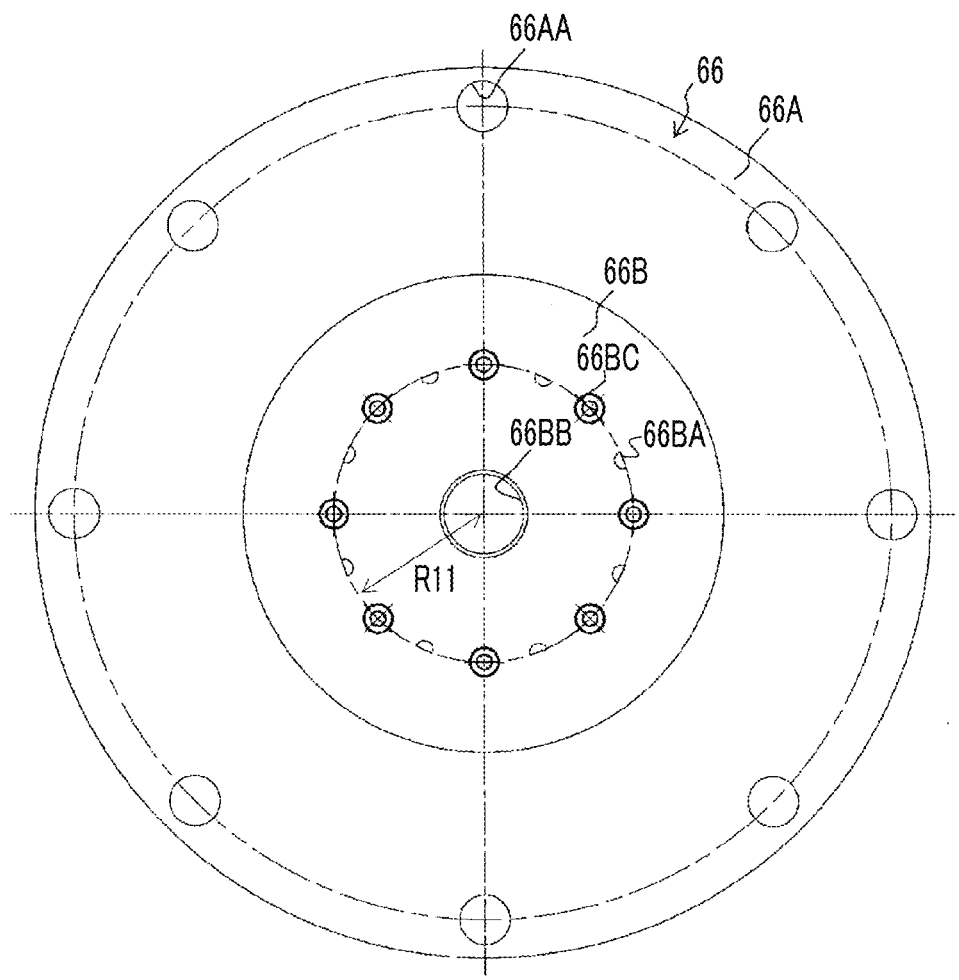
FIG. 8 is a view showing a cover body of the simple planetary reduction gear of FIG. 6.

Here, in the reduction gear 14, a configuration of a modification example in which the cover body (cover) 66 is studied will be described in detail with reference to FIGS. 6 to 8.

The cover body 66 of the motor casing 64 is disposed on the motor 12 side of the simple planetary reduction gear 14. The cover body 66 is also used for the cover of the reduction gear 14, and closes the motor 12 side of the simple planetary reduction gear 14. That is, the cover body 66 is a member for dividing the motor 12 and the simple planetary reduction gear 14, and covers the upper portion of the simple planetary reduction mechanism 38. The cover body 66 includes a flange portion 66A and an inclined portion 66B.

The flange portion 66A is integrally formed with the motor casing 64, and a through hole 66AB through which the motor shaft 12A passes is provided in the flange portion 66A. An oil seal 63 is disposed in the through hole 66AB.

A through hole 66BB through which the motor shaft 12 passes is also provided in the inclined portion 66B, and the inclined portion 66B includes an inclined surface S which is continuous to be inclined downward from the outer side to the inner side in the radial direction of the sun gear 18 on the surface of the simple planetary reduction mechanism 38 side. In the present embodiment, the inclination of the inclined surface S is constant. The terminal position in the inside in the radial direction of the inclined surface S extends up to the nearest vicinity of the motor shaft 12A inside a position P1 in the outermost diameter of the sun gear 18. That is, the terminal position (the inner end in the radial direction of the inclined portion 66B) in the inside in the radial direction of the inclined surface S is positioned further inside in the radial direction than the oil seal 63. In addition, the inclined surface S is formed up to the side surface which comes into contact with the inner surface of the first casing body 21 over the position at which the cover body 66 and the internal gear 36 overlap each other when viewed in the axial direction (in the present embodiment, when the inclined surface S is viewed in the axial direction, the position at which the cover body 66 and the internal gear 36 overlap each other may be the intermediate position of the inclined surface S, or may be a starting point (end portion) of the inclined surface S). Concave portions 66BA are intermittently provided on the inclined surface S in the circumferential direction in a predetermined diameter R11 in which the shaft center O1 is the center. Accordingly, the inclined portion S which is inclined downward is discontinuously provided, and the concave portion 66BA can cause the lubricant introduced along the inclined surface S to be collected at the concave portion 66BA (there is the continuous inclined portion S which is inclined downward in front and rear in the radial direction and right and left in the circumferential direction in which the concave portion 66BA exists). In addition, the predetermined diameter R11 is coincident with the distance R11 up to the shaft center of the revolving planetary gear 34 (the shaft center of the planetary pin 40).

The flange portion 66A is integrated with the inclined portion 66B by a bolt 81 which engages with the bolt hole 66BC provided in the inclined portion 66B. That is, the inclined portion 66B is separately configured in the cover body 66. In addition, in FIG. 3, a reference numeral 66AA is a bolt hole with which the bolt 80 for connecting the motor 12 and the reduction gear 14 engage each other.

In addition, a lubricant passage 40A is provided in the planetary pin 40. The lubricant passage 40A includes one axial passage 40B and a plurality of horizontal passages 40C which are orthogonal to the axial passage 40B and radially extend. The axial passage 40B is provided to axially penetrate the planetary pin 40 at the shaft center of the planetary pin 40. That is, the position of the axial passage 40B when viewed in the axial direction is coincident with the position of the concave portion 66BA of the inclined portion 66B. In other words, the concave portion 66BA is intermittently provided in the revolution direction of the planetary gear 34 at the position above the axial passage 40B of the cover body 66 (lubricant passage 40A). The horizontal passage 40C extends in the radial direction of the planetary pin 40 and is provided to penetrate the planetary pin 40 at the position at which two rows of roller bearings 42 are adjacent to each other.

In the casing 20, the lubricant is sealed so as to reach the oil level L1 corresponding to the approximately center position in the axial direction of the sun gear 18. The oil level L1 corresponds to the position which is higher than a lower end position of the gear portion 18A of the sun gear 18 and is lower than an upper end position of the sun gear 18. That is, regardless of the presence or absence of the rotating operation in the reduction gear 14, the lubricant having the amount exposed to at least a portion of the sun gear 18, the planetary gear 34, and the internal gear 36 is sealed in the casing 20. Moreover, since agitating resistance is increased as the lubricant is increased, the amount of the generation of heat is increased when a great amount of lubricant is agitated. Accordingly, in order to decrease the amount of the generation of heat, in the present embodiment, the casing 20 is not fully filled with the lubricant sealed into the casing 20, but is filled with the lubricant having the corresponding amount.

Next, particularly, the operations related to the output member 44 and the cover body 66 will be described.

When the motor shaft 12A is rotated, the sun gear 18 connected to the motor shaft 12A is rotated. Accordingly, the lubricant is scattered by the sun gear 18, and the oil surface of the lubricant becomes a mortar shape in which the shaft center of the motor shaft 12A (shaft center of the sun gear 18) is set to the lowermost position.

Here, since the sun gear 18, the planetary gear 34, and the internal gear 36 are helical gears, when the sun gear 18 is rotated in one direction, the lubricant is not scattered downward but is scattered upward obliquely. That is, the oil drops are directly attached to the cover body 66 by the scattering, or the oil surface of the lubricant becomes a steeper mortar shape (compared to a simple spur gear). Accordingly, the level of the oil surface is lowered due to the mortar shape, and thus, there is a concern that the sun gear 18 may hardly be immersed into the oil. This phenomenon is generated in the related art (for example, Japanese Unexamined Patent Application Publication No. 2012-122552), and similarly in the present embodiment. However, in the present embodiment, in this case, the oil surface comes into direct contact with the inclined surface S at the position at which the internal gear 36 and the inclined surface S overlap each other when viewed in the axial direction, that is, at the position of the edge of the mortar shape. That is, in the present embodiment, the lubricant attached to the inclined surface S at the contact position is introduced in the inside in the radial direction by the inclined surface S along with the oil drops which are directly attached to the cover body 66.

In addition, the lubricant is collected at the portion of the concave portion 66BA provided on the inclined surface S. Accordingly, the corresponding lubricant drops downward at the position of the concave portion 66BA. This position is the position of the shaft center of the planetary pin 40. Accordingly, (although the entire dropping lubricant is not introduced,) the dropping lubricant is introduced into the lubricant passage 40A from the upper end opening of the axial passage 40B (in addition, in the present embodiment, since the bolt hole 66BC with respect to the planetary pin 40 has the same position relationship as the concave portion 66BA, the bolt 81 disposed in the bolt hole 66BC also exerts the same effects as the concave portion 66BA). The lubricant introduced into the lubricant passage 40A is supplied to the two-step roller bearing 42 from the horizontal passage 40C via the axial passage 40B. That is, the lubricant introduced into the lubricant passage 40A can more smoothly rotate the planetary pin 40 of the planetary gear 34.

Meanwhile, in the inclined surface S on which the concave portion 66BA is not provided, the lubricant is introduced up to the inside in the radial direction from the position P1 of the outermost diameter of the sun gear 18, and thus, the lubricant reaches the corresponding motor shaft 12A. Accordingly, the lubricant reaching the motor shaft 12A can directly lubricate the fitting portion between the motor shaft 12A and the sun gear 18, and a meshing portion between the sun gear 18 and the planetary gear 34. Moreover, the lubricant which does not reach the motor shaft 12A and is introduced into the inside in the radial direction can directly lubricate the meshing portion between the sun gear 18 and the planetary gear 34 when the lubricant drops.

Conversely, when the sun gear 18 is rotated in the other direction, the lubricant is scattered not upward but downward obliquely. Accordingly, the oil surface in the vicinity of the shaft center of the sun gear 18 is not largely decreased, and the oil surface becomes a gentler mortar shape (compared to the simple spur gear). Accordingly, the sun gear 18 can be immersed into the corresponding oil. In addition, also in this case, when the lubricant is scattered to the sun gear 18 and the oil drops are attached to the cover body 66, as described above, the oil drops can directly be contributed to the lubrication of the sun gear 18 or the planetary gear 34.

That is, in the present embodiment, the cover body 66 which covers the upper portion of the simple planetary reduction mechanism 38 includes the continuous inclined surface S which is inclined downward from the outside to the inside in the radial direction of the sun gear 18. Accordingly, in the present embodiment, in the lubricant which is scattered by the rotation of the sun gear 18, the lubricant attached to the cover body 66 can be introduced into the inner side in the radial direction along the inclined surface S. That is, (the lubricant does not drop downward at the position at which the lubricant is attached to the cover body 66), the lubricant moves to the inside in the radial direction from the position at which the lubricant is attached to the cover body 66 and can drop downward from the cover body 66. That is, according to the present embodiment, it is possible to promote the supply of the lubricant to the sun gear 18 which is rotated at the highest speed.

Moreover, in the present embodiment, the member (inclined portion 66B) configuring the inclined surface S is configured to be separated from the cover body 66. That is, in this embodiment, the oil seal 63 is incorporated into the flange portion 66A of the cover body 66, and it is possible to dispose the inclined portion 66B including the inclined surface S to cover the flange portion. Accordingly, it is possible to easily incorporate the oil seal 63 which is needed between the cover body 66 and the motor shaft 12A. Specifically, it is possible to suitably provide the inclined surface S without limiting the position of the oil seal 63 while reliably sealing the lubricant of the casing 20 by disposing the oil seal 63 to be generally used. More specifically, the terminal position of the inclined surface S in the inside in the radial direction can be positioned further inside in the radial direction than the oil seal 63. In addition, since the inclined portion 66B is configured to be separated from the cover body, it is possible to appropriately replace only the inclined portion 66B according to the use conditions of the reduction gear 14 without changing the flange portion 66A.

Moreover, for example, in the above-described embodiment, the inclination of the inclined surface S is constant. However, the inclination may be not constant. For example, the inclined surface S may be a curved surface. Moreover, in the "continuous inclined surface", the specific range in the circumferential direction may be continuously inclined, and as the above-described concave portion 66BA or bolt 81, only the specific position (or the range) in the circumferential direction may be discontinuous (this is included in the concept of the "continuous inclined surface"). That is, it is not necessarily continuous in the overall circumferential direction and radial direction on the surface corresponding to the inclined surface S.

In addition, in the above-described embodiment, since the sun gear 18, the planetary gear 34, and the internal gear 36 are helical gears, a rising degree of the oil surface of the lubricant is sharply changed in the rotation direction of the sun gear 18. Accordingly, certain embodiments of the invention are suitably applied to the above-described embodiment. However, certain embodiments are not limited to this. For example, the sun gear, the planetary gear, and the internal gear may be spur gears.

In addition, in the above-described embodiment, the terminal position in the inside in the radial direction of the inclined surface S is positioned inside the position P1 of the outermost diameter of the sun gear 18, and the inclined surface S is also provided at the position at which the cover body 66 and the internal gear 36 overlap each other when viewed in the axial direction. However, certain embodiments of the invention are not limited to this. The terminal position in the inside in the radial direction of the inclined surface S may be positioned outside the position of the outermost diameter of the sun gear, and the inclined surface S may not be provided at the position at which the cover body and the internal gear overlap each other when viewed in the axial direction. In either case, since the lubricant is introduced in the inside in the radial direction rather than the lubricant dropping downward at the position at which the lubricant is attached to the cover, it is possible to promote the supply of the lubricant to the sun gear.

In addition, in the above-described embodiment, the inclined portion 66B configuring the inclined surface S is configured to be separated from the cover body 66. However, certain embodiments of the invention are not limited to this, and the inclined portion 66B may be integrally formed with the cover body 66.

In addition, in the above-described embodiment, the lubricant passage 40A is provided in the planetary pin 40, and the concave portions 66BA are intermittently provided in the revolution direction of the planetary gear 34 at the position above the lubricant passage 40A of the cover body 66. However, certain embodiments of the invention are not limited to this, and instead of the concave portion 66BA, a convex portion may be provided. In either case, the lubricant introduced to the inclined surface S can be collected at the concave portion or the convex portion, and thus, the lubricant can drop at the positions. Of course, the lubricant passage may not be provided in the planetary pin, and the concave portion may not be provided on the cover.

Moreover, in the above-described embodiment, the cover body 66 is the member which divides the motor 12 which is disposed above the cover body 66 and is connected to the front step and the simple planetary reduction mechanism 38 which is disposed below the cover body 66. However, certain embodiments of the invention are limited to this. For example, if the front-step speed reducer is disposed above the cover body 66, the cover body 66 may be a member which divides the front-step speed reducer and the simple planetary reduction mechanism, and if the rear-step speed reducer (that is, an image of the drive unit turned upside down) is disposed above the cover body 66, the cover body 66 may be a member which divides the rear-step speed reducer and the simple planetary reduction mechanism.

In addition, in the above-described embodiment, the lubricant having the amount by which at least a portion of the sun gear 18, the planetary gear 34, and the internal gear 36 is exposed is sealed. However, certain embodiments of the invention are not limited to this, and the lubricant having the amount by which the sun gear, the planetary gear, and the internal gear are all immersed may be sealed.

The above-described configurations related to the cover body (cover) are configured as follows.

(B1) In a simple planetary reduction gear which includes a simple planetary reduction mechanism including a sun gear, a planetary gear which revolves around the sun gear and is supported by a carrier, and an internal gear with which the planetary gear internally meshes, and in which the simple planetary reduction gear is used in a vertically installed state, a cover covering the upper portion of the simple planetary reduction mechanism may be configured to include a continuous inclined surface which is inclined downward from the outside toward the inside in the radial direction of the sun gear.

Accordingly, in lubricant which is scattered by the rotation of the sun gear, lubricant attached to the cover can be introduced into the inner side in the radial direction along the continuous inclined surface which is inclined to the lower side of the cover. That is, (the lubricant does not drop downward at the position at which the lubricant is attached to the cover), the lubricant moves to the inside in the radial direction from the position at which the lubricant is attached to the cover and can drop downward from the cover.

(B2) In this case, the lubricant having the amount by which at least a portion of the sun gear, the planetary gear, and the internal gear is exposed may be sealed.

(B3) (Since the helical gear, which has high performance but has disadvantages due to the inclination of the liquid surface, can be applied without problems), the sun gear, the planetary gear, and the internal gear can be helical gears.

(B4) A terminal position in the inside in the radial direction of the inclined surface may be inside the position of the outermost diameter of the sun gear.

(B5) A member configuring the inclined surface may be configured to be separated from the cover.

(B6) The inner end in the radial direction of the member configuring the inclined surface may be disposed in the inside in the radial direction from the oil seal disposed in the cover.

(B7) The inclined surface may be also provided at the position at which the cover and the internal gear overlap each other when viewed in the axial direction.

(B8) A lubricant passage may be provided in a planetary pin which rotatably supports the planetary gear, and a convex portion or a concave portion may be intermittently provided in the circumferential direction at the position above the lubricant passage of the cover.

Next, a modification example in which an exhaust configuration of an upper space SP1 of the simple planetary reduction mechanism 38 of the simple planetary reduction gear 14 is studied will be described in detail. For easy understanding, the portions overlapping with the above-described matters also will be described in order.

Figure 9:
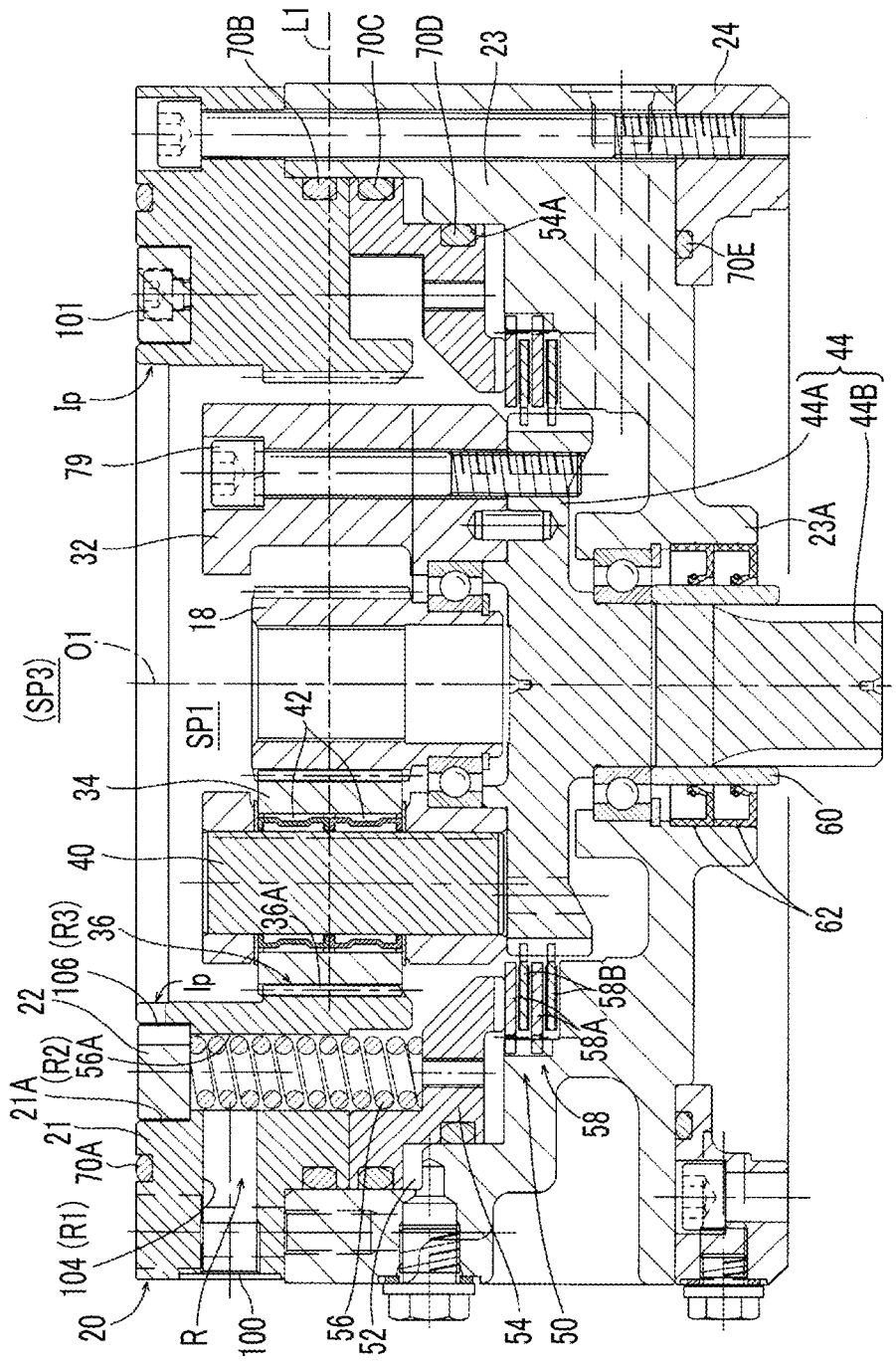
FIG. 9 is a cross-sectional view which shows another modification example of the simple planetary reduction gear and is equivalent to FIG. 1.

First, with reference to mainly FIGS. 9 and 10, the configuration of the casing 20 will be described. As described above, the casing 20 mainly includes the first to fourth casing bodies 21 to 24.

The first casing body 21 (first member) includes an air vent port 100. The internal gear 36 is integrally formed with the first casing body 21, and the inner teeth 36A of the internal gear 36 is formed on the inner circumference. Moreover, in the first casing body 21, spring holes 56A accommodating the coil springs 56 of the brake mechanism 50 are formed along the axial direction at the plurality of locations (eight locations in this example) in the circumferential direction. The ring-shaped concave portion 21A is formed on the upper portion of the spring hole 56A.

The second casing body 22 (second member) has the ring shape which is fitted to the concave portion 21A formed in the first casing body 21, and closes the spring hole 56A (which accommodates the coil spring 56) by the bolt 101.

The third casing body 23 is connected to the lower side of the first casing body 21. A portion of the inner circumference of the third casing body 23 configures the cylinder surface 54A of the piston 54 of the brake mechanism 50. The third casing body 23 continues up to the load side surface of the first-stage simple planetary reduction gear 14, and includes the cylindrical pipe portion 23A at the center of the load side surface.

The fourth casing body 24 is formed in a ring shape, and serves as a bridge for the connection between the second-stage simple planetary reduction gear 15 and the casing 26 (FIG. 2).

In addition, the output shaft portion 44B of the output member 44 protrudes to the outside (to the second-stage simple planetary reduction gear 15 side) of the casing from the cylindrical pipe portion 23A. The bushing 60 is press-fitted to the outer circumference of the output shaft portion 44B of the output member 44, and two oil seals 62 are disposed to be arranged between the bushing 60 and the cylindrical pipe portion 23A and seal the lower side of the oil space inside the casing 20 of the first-stage simple planetary reduction gear 14.

This simple planetary reduction mechanism 38 is disposed at the step next to the motor 12 (the space such as a brake chamber is not interposed between the motor 12 and the simple planetary reduction mechanism 38). That is, the upper space SP1 of the simple planetary reduction mechanism 38 is closed by the cover body (cover) 66 of the motor casing 64 (which is also used for the cover of the reduction gear 14) (in order words, a space SP3 above the cover body 66 is a space inside the motor). Accordingly, basically, the space SP3 above the cover body 66 which covers the upper space SP1 of the simple planetary reduction mechanism 38 cannot be used as the passage which introduces the oil or a buffer space which can accommodate the oil. In addition, for example, when a "separate space" is secured between the upper space SP1 of the simple planetary reduction mechanism 38 and the space SP3 inside the motor 12 by disposing a partition wall or the like, since the length in the axial direction of the simple planetary reduction gear 14 itself is increased, this is not preferable.

Accordingly, in this embodiment, the following configuration is adopted.

Figure 12:
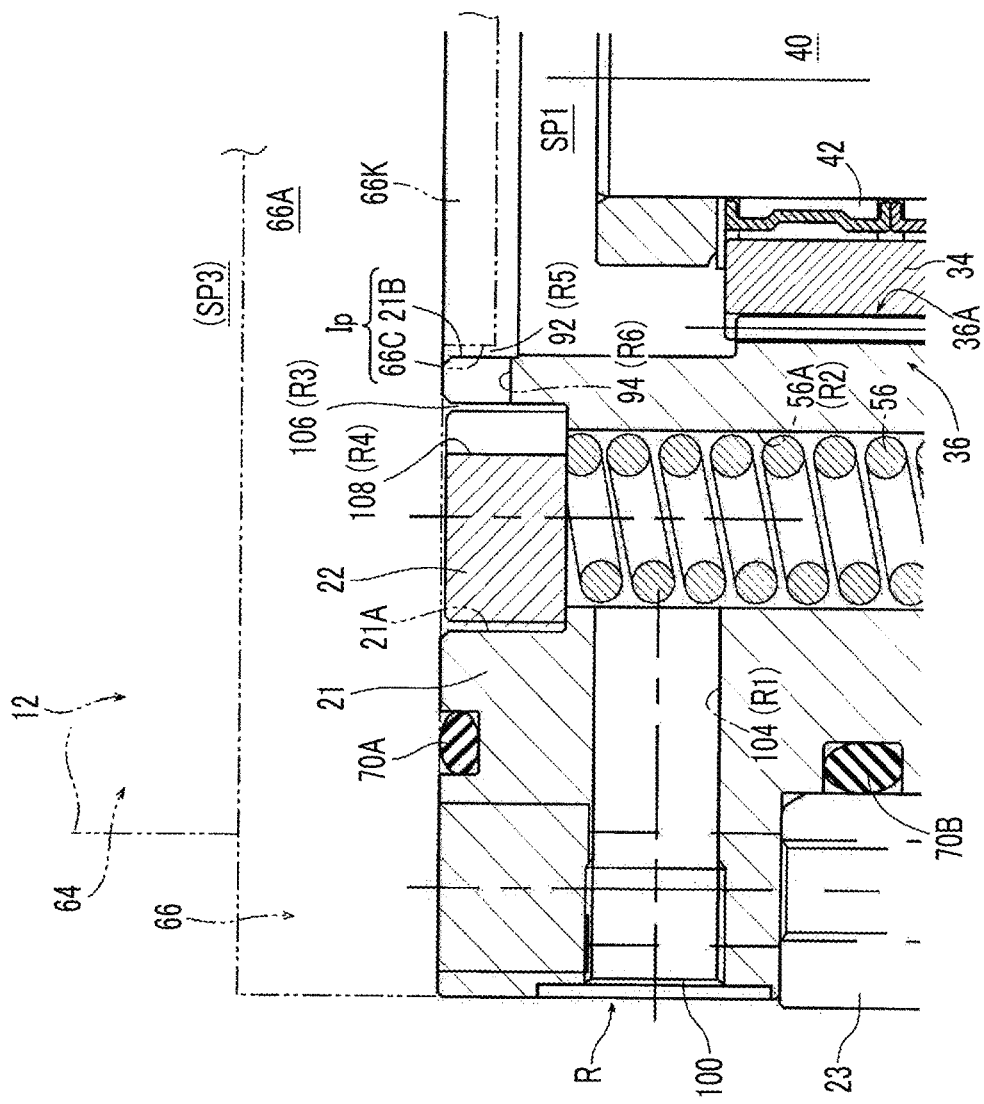
FIG. 12 is a main enlarged view showing an air vent passage of the simple planetary reduction gear of FIG. 9.

FIG. 12 is a main enlarged view showing the air vent passage R. In addition, for easy understanding, the gap between members or the like is shown so as to be exaggeratively enlarged.

The simple planetary reduction gear 14 includes the air vent port 100 which is provided in the casing 20, a buffer tank 102 (refer to FIG. 10) which is disposed outside (the first casing body 21 of) the casing 20 and is connected to the air vent port 100 by screw connection, and an air vent passage R which causes the air vent port 100 and the upper space SP1 of the simple planetary reduction mechanism 38 to communicate with each other.

The air vent passage R positively uses the fact that the casing 20 is divided into the first casing body 21 (first member) and the second casing body 22 (second member).

More specifically, a main cylindrical path 104 configuring a first passage R1 of the air vent passage R is connected to the air vent port 100. The main cylindrical path 104 linearly extends to the inside in the radial direction from the air vent passage R, and is not directly opened to the upper space SP1 of the simple planetary reduction mechanism 38. In addition, here, "the direct opening with respect to the upper space of the simple planetary reduction mechanism being not achieved" means that an aspect, in which the air vent passage R linearly extends to the inside in the radial direction from the air vent port 100 and reaches the upper space SP1 of the simple planetary reduction mechanism 38 as it is, is not achieved.

In this embodiment, the main cylindrical path 104 is directly opened to the spring hole 56A (the space different from the upper space SP1 of the simple planetary reduction mechanism 38) which accommodates the coil spring 56 of the brake mechanism 50 of the simple planetary reduction mechanism 38. That is, in this embodiment, the spring hole 56A configures a second passage R2 of the air vent passage R.

The spring hole 56 is provided in the first casing body 21, and the second casing body 22 (in which the spring hole 56A is not formed) closes the spring hole 56A along with the bolt 101. Moreover, a gap 106 between (the concave portion 21A of) the first casing body 21 and the second casing body 22 becomes a third passage R3 of the air vent passage R, and communicates with the upper space SP1 of the simple planetary reduction mechanism 38 (more specifically, the gap communicates with the upper space SP1 of the simple planetary reduction mechanism 38 via the remaining portion of the air vent passage R described hereafter).

Figure 11:
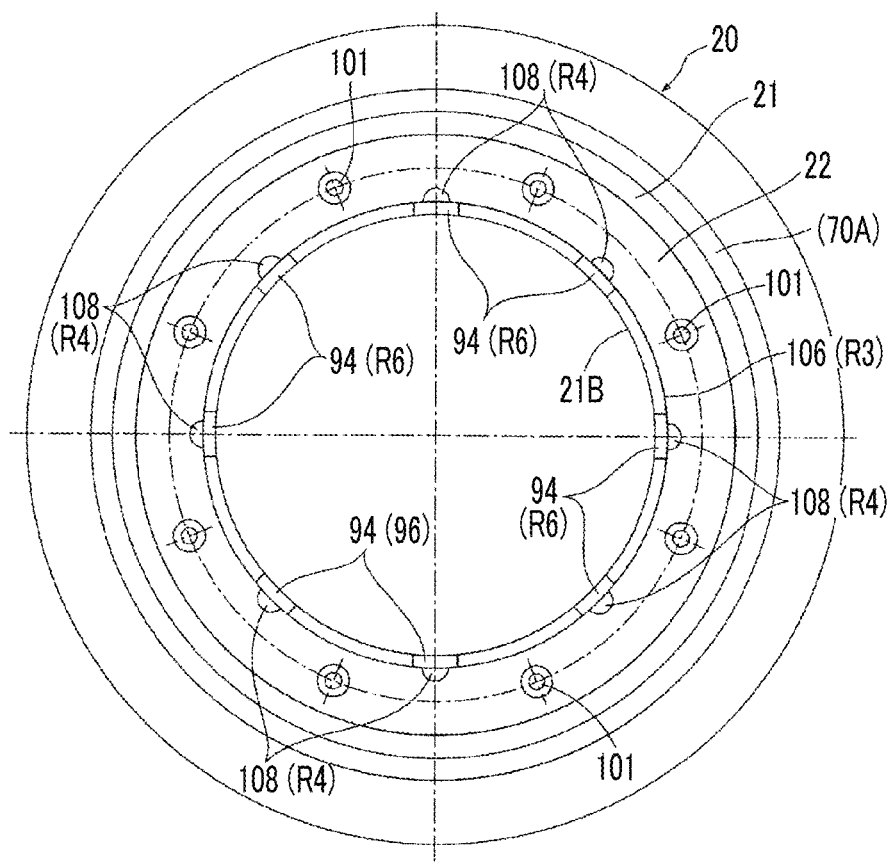
FIG. 11 is a front view of a cover body of the simple planetary reduction gear of FIG. 9.

In this embodiment, in order to more smoothly perform the flow of the air at the gap 106 (the third passage R3) between the first casing body 21 and the second casing body 22 (particularly, in order to more smoothly perform the flow between the spring hole 56A (second passage R2) and the third passage R3), as shown in FIGS. 11 and 12, an enlarged gap portion 108 between cases (a portion having a larger gap) is formed on the gap 106 side of the second casing body 22. The enlarged gap portions 108 between cases are formed by notching a portion of the second casing body 22 (more specifically, a portion in the circumferential direction of the first casing body 21 side) in a semicircular shape along the axial direction at a plurality of locations (eight locations in the shown example) (refer to FIG. 11). The enlarged gap portion 108 between cases functions as a fourth passage R4 of the air vent passage R, and assists the passage of the air through the gap 106 (third passage R3).

As described above, the upper space SP1 of the simple planetary reduction mechanism 38 is closed by the cover body 66 of the motor 12. According to this closing, the first casing body 21 and the cover body 66 are fitted to each other via a pair of spigot fitting surfaces Ip. The spigot fitting surface Ip includes a step portion 66C in the vertical direction between the flange portion 66A of the cover body 66 and a thick portion 66K in the center in the radial direction, and an inner circumferential end portion 21B of the first casing body 21 opposing the step portion 66C. Since the spigot fitting surface Ip (the step portion 66C and the inner circumferential end portion 21B of the first casing body 21) is realized by clearance fitting, a gap 92 exists.

In the present embodiment, the gap 92 of the spigot fitting surface Ip is used as a fifth passage R5 of the air vent passage R. The fifth passage R5 causes the gap 106 (third passage R3) between the first casing body 21 and the second casing body 22, and the upper space SP1 of the simple planetary reduction mechanism 38 to communicate with each other. In addition, when an enlarged gap portion 94 between spigot surfaces is provided, the gap 92 of the spigot fitting surface Ip may not be formed (the gap may be 0 or interference fitting may be performed).

The air of the upper space SP1 of the simple planetary reduction mechanism 38 can pass through the gap 92 (fifth passage R5) of the spigot fitting surface Ip. However, in the present embodiment, as shown in FIG. 11, in order to more smoothly perform the passage of the air at the gap 92 (fifth passage R5), the enlarged gap portion 94 between the spigot surfaces (the portion having a larger gap) is formed on a portion in the circumferential direction of the spigot fitting surface Ip. The enlarged gap portions 94 between the spigot surfaces are formed by notching a portion in the circumferential direction of the spigot fitting surface Ip (more specifically, a portion in the circumferential direction of the inner circumferential end portion 21B of the first casing body 21) at a plurality of locations (eight locations in the shown example). The enlarged gap portion 94 between the spigot surfaces functions as a sixth passage R6 of the air vent passage R, and assists the passage of the air through the gap 92 (fifth passage R5) of the spigot fitting surface Ip.

As a result, in the present embodiment, the air vent passage R between the air vent port 100 and the upper space SP1 of the simple planetary reduction mechanism 38 includes the first passage R1 configured of the main cylindrical path 104, the second passage R2 configured of the spring hole 56A accommodating the coil spring 56 of the brake mechanism 50, the third passage R3 configured of the gap 106 between the first casing body 21 and the second casing body 22, the fourth passage R4 configured of the enlarged gap portion 108 between cases having a larger gap than the gap 106 (third passage R3), the fifth passage R5 configured of the gap 92 of the spigot fitting surface Ip (the step portion 66C of the cover body 66 and the inner circumferential end portion 21B of the first casing body 21), and the sixth passage R6 configured of the enlarged gap portion 94 between spigot surfaces having a larger gap than the gap 92 (fifth passage R5).

As described above, the buffer tank 102 which is disposed outside the casing 20 is connected to the air vent port 100 by screw connection. In this embodiment, the capacity of the buffer tank 102 is smaller than that of the related art.

As described above, the reference numerals 70A to 70E indicate O-rings. Among these, the O-ring 70A seals the portion between (the first casing body 21 of) the casing 20 and the cover body 66 of the motor 12 (the portion between the casing 20 and the cover body 66 is closed by the O-ring 70A) in the position of the first casing body 21 further outside in the radial direction than the gap 106 between the first casing body 21 and the second casing body 22.

Figure 10:
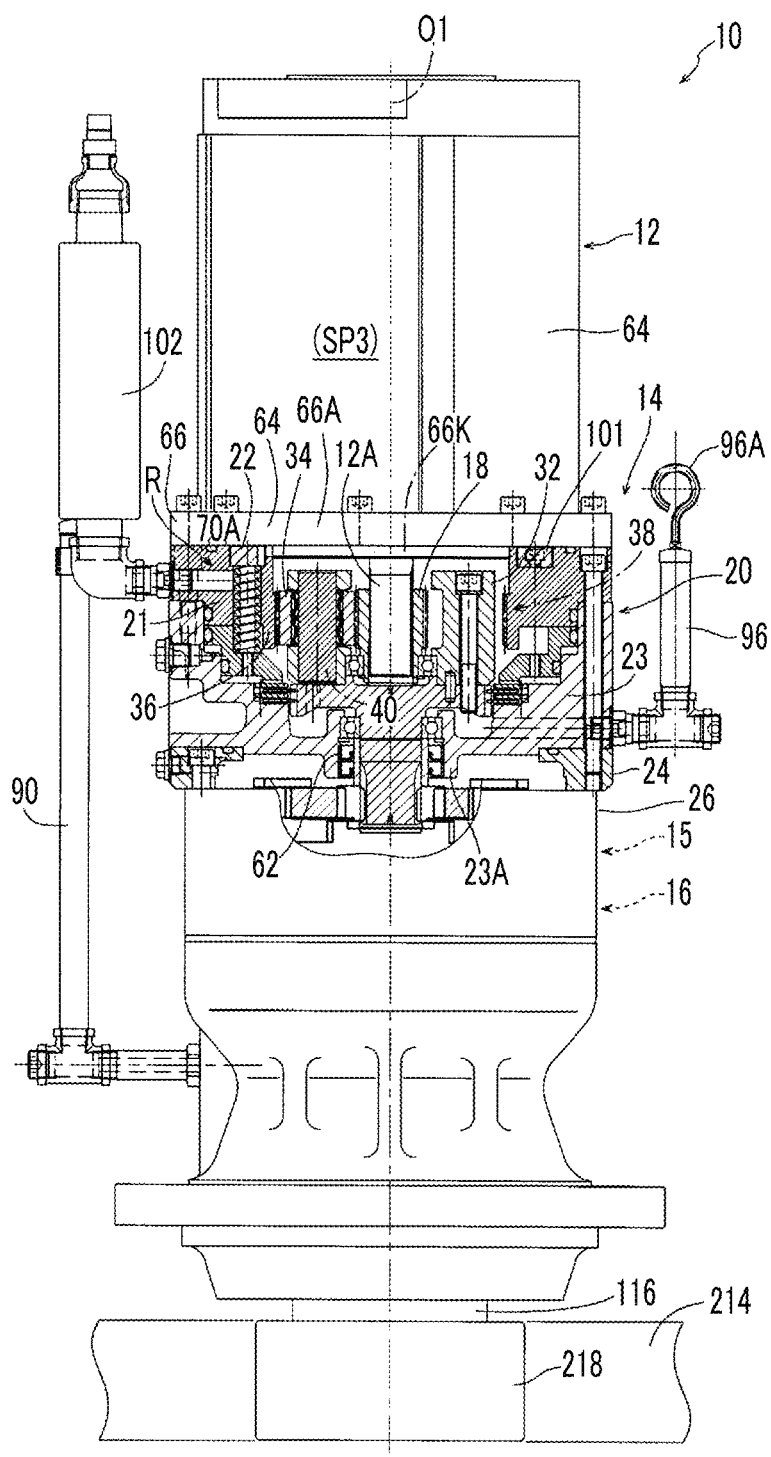
FIG. 10 is a cross-sectional view showing a drive unit of the simple planetary reduction gear of FIG. 9.

Moreover, reference numerals 90 and 96 of FIG. 10 indicate oil gauges which detect the level of the oil, and a reference numeral 96A indicates a dipstick of the oil gauge (a rod-shaped instrument which is immersed into the oil and detects the oil level according to the change of color). The reason why two oil gauges 90 and 96 are provided is because there are two sealing spaces of the oil in the drive unit 10. The oil gauge 96 corresponds to the oil gauge which detects the oil level L1 in the casing 20 of the reduction gear 14. Moreover, in this embodiment, the oil level L1 in the casing 20 is set so as to be low (to the approximately center position in the axial direction of the sun gear 18).

Next, the operation of the simple planetary reduction gear 14, particularly, the operation which exhausts the air of the upper space SP1 of the simple planetary reduction mechanism 38 will be described.

When the motor 12 for swiveling the shovel car 200 is driven, the sun gear 18 of the simple planetary reduction mechanism 38 is rotated, and the planetary gear 34 revolves around the sun gear 18. Accordingly, the phenomenon where the shape of the oil in the casing 20 becomes a mortar shape is generated. As the present embodiment, this phenomenon is likely to remarkably be generated when gears 18, 34, and 36 of the simple planetary reduction mechanism 38 are helical gears and the motor shaft is rotated in a specific rotation direction. When the phenomenon where the shape of the oil surface becomes a mortar shape is generated, the oil level in the vicinity of the inner wall of the casing 20 largely increases, and the oil presses the inner wall of the casing 20 to the outside in the radial direction by the generated centrifugal force.

In the related art, since the air vent passage (second communication path in Japanese Unexamined Patent Application Publication No. 2008-232269) connected to the air vent port is directly opened to the upper space of the simple planetary reduction mechanism, the oil easily moves from the inside of the casing to the buffer tank side, and there is a problem that the oil flowed into the casing may overflow (when the capacity of the buffer tank is small). Accordingly, the corresponding large capacity is required for the buffer tank, and an increase in the weight, an increase in the size, and an increase in the cost are generated. In addition, since the oil in the casing is flowed into the buffer tank side in a great amount, the oil level in the casing, particularly, the oil level in the vicinity of the sun gear (requires the greatest lubrication) in the center in the radial direction is decreased, and thus, there is a problem that sufficient lubrication is not performed. Accordingly, in order to secure sufficient lubrication performance, it is necessary to maintain a high oil level (for example, as described in Japanese Unexamined Patent Application Publication No. 2008-232269, so that the sun gear is approximately immersed) by increasing the amount of the sealed oil. However, when the oil level is increased, the agitating resistance is also increased, and a further larger buffer tank is needed.

In the present embodiment, basically, since the operation by which the air passes through but the oil does not pass through if possible is obtained, the above-described disadvantages are largely decreased.

That is, in the present embodiment, the air vent passage R is not directly opened to the upper surface SP1 of the simple planetary reduction mechanism 38, and particularly, communicates with the upper space SP1 of the simple planetary reduction mechanism 38 via the gap 106 (third passage R3) between the first casing body 21 and the second casing body 22. Accordingly, for example, even when the shape of the oil of the upper space SP1 becomes a mortar shape, the oil cannot easily pass through the air vent passage R, and as a result, only the air to be exhausted can pass through to the buffer tank 102 side via the air vent passage R.

More specifically, the air of the upper space SP1 of the simple planetary reduction mechanism 38 reaches the air vent port 100 via the fifth passage R5 configured of the gap 92 of the spigot fitting surface Ip (+ the sixth passage R6 configured of the enlarged gap portion 94 between the spigot surfaces), the third passage R3 configured of the gap 106 between the first casing body 21 and the second casing body 22 (+ fourth passage R4 configured of the enlarged gap portion 108 between the cases), the second passage R2 configured of the spring hole 56A, and the first passage R1 configured of the main cylindrical path 104, and the air is discharged to the buffer tank 102 connected to the air vent port 100.

The outflow of the oil via the air discharge passage R is not nearly generated, and thus, it is possible to further decrease the capacity of the buffer tank 102.

Moreover, since it is possible to maintain the amount of the oil in the casing 20 so as to be substantially constant at all times even during the operating (during swiveling), it is possible to set the initial oil level L1 so as to be low (for example, set to the level in the vicinity of the center in the axial direction of the sun gear 18), and it is possible to maintain high lubrication performance while decreasing the agitating resistance.

Moreover, in the present embodiment, using the fact that the first casing body 21 (the first member) is fitted to the cover body 66 via the spigot fitting surface Ip, the upper space SP1 of the simple planetary reduction mechanism 38 communicates with the gap 106 (third passage R3) between the first casing body 21 and the second casing body 22 via the gap 92 (fifth passage R5) of the spigot fitting surface Ip. Accordingly, since the oil does not enter the gap 106 (third passage R3) side between the first casing body 21 and the second casing body 22 of the air vent passage R from the upper space SP1 of the simple planetary reduction mechanism 38 if the oil does not pass through the gap 92 (fifth passage R5) of the spigot fitting surface Ip, it is possible to further prevent the oil from being flowed out.

In addition, the portion between the position positioned further outside in the radial direction than the gap 106 (third passage R3) (between the first casing body 21 and the second casing body 22) of the casing 20 and the cover body 66 of the motor 12 is closed (sealed) by the O-ring 70A (seal member). Accordingly, the gap 106 between the first casing body 21 and the second casing body 22 functions as the third passage R3 which is a portion of the air vent passage R, and it is possible to prevent the oil from the upper space SP1 of the simple planetary reduction mechanism 38 from overflowing from the portion between the casing 20 of the reduction gear 14 and the cover body 66 of the motor 12.

Moreover, the enlarged gap portion 94 (the portion in which the gap 92 is enlarged) between the spigot surfaces in which the gap 92 (fifth passage R5) between the first casing body 21 and the cover body 66 is partially enlarged is formed on the a portion in the circumferential direction of the spigot fitting surface Ip, and the enlarged gap portion 94 between the spigot surfaces serves as the sixth passage R6. Since the enlarged gap portion 94 between the spigot surfaces (the sixth passage R6) is too small so as to allow the oil to pass through the gap portion 94 but sufficiently large so as to allow the air to pass through the gap portion 94, relatively, the air can more easily pass through the gap portion than the oil.

In addition, in the present embodiment, in order to more smoothly perform the flow of the air in the gap 106 (third passage R3) between the first casing body 21 and the second casing body 22, the enlarged gap portion 108 between the cases (the portion in which the gap 106 is enlarged) is also formed on the gap 106, and the enlarged gap portion 108 between the cases serves as the fourth passage R4. Since the enlarged gap portion 108 between the cases (fourth passage R4) also is too small so as to allow the oil to pass through the gap portion 108 but sufficiently large so as to allow the air to pass through the gap portion 108, relatively, the air can more easily pass through the gap portion than the oil.

Moreover, in the present embodiment, the air vent passage R connected to the air vent port 100 is directly opened to the spring hole 56A, and the spring hole 56A configures the second passage R2. The coil spring 56 disposed in the spring hole 56A serves as the resistance with respect to the passage of the oil. However, the air can pass through the coil spring without any trouble. Accordingly, also here, relatively, the air can more easily pass through the gap portion than the oil.

Moreover, in the present embodiment, the buffer tank 102 is provided. However, in certain embodiments of the invention, since it is possible to nearly prevent outflow of the oil, according to the use conditions, the buffer tank may not be present (the requirement can be eliminated). Conversely, in certain embodiments of the invention, it is possible to decrease the capacity of the buffer tank or cause the capacity not to be required. However, it is not necessarily necessary to decrease the capacity of the buffer tank or to "remove" the buffer tank, and for example, certain embodiments of the invention include the similar buffer tank to the related art, and thus, the effects of certain embodiments of the invention may be focusing on the effect such as "overflowing of the oil from the buffer tank being reliably prevented".

Similarly, in certain embodiments of the invention, it is possible to obtain the effect which further decreases the oil level in the casing than in the related art (can decrease the sealing amount of the oil). However, it is not necessarily necessary to further decrease the oil level than in the related art, and for example, the oil surface level is maintained to the similar height as in the related art, and the effects of certain embodiments of the invention may be focusing on the effect such as further increasing the lubrication performance. Also in this case, since most of the oil in the casing is maintained inside the casing, it is unnecessary to increase the size of the buffer tank in proportion to the amount of the oil.

In addition, in certain embodiments of the invention, the configuration is indispensible in which the air vent passage is not directly opened to the upper space of the simple planetary reduction mechanism and the air vent passage communicates with the upper space of the simple planetary reduction mechanism via the gap between the first member and the second member. However, the specific configurations with respect to the air vent passages other than the above-described configuration are not particularly limited.

For example, it is not necessarily necessary to set the spigot fitting surface between the first member and the cover body to a portion of the air vent passage, and it is not necessarily necessary to form the portion, in which the gap between the first member and the cover body is enlarged, on a portion in the circumferential direction of the spigot fitting surface. Moreover, for example, also when the enlarged gap portion between the spigot surfaces is formed in the air vent passage, in addition to the configuration in which the notch or the groove is provided on the first member side as the above-described embodiment, a configuration in which the notch or the groove is provided on the cover body side may be adopted. Alternatively, instead of the notch or the groove, a through hole may be formed to be hollow, or a protrusion or a spacer which comes into contact with only a portion (or in which only a portion is formed to be hollow) may be disposed. This modification may be similarly applied to the formation of the enlarged gap portion between the cases.

The above-described air exhaust configurations are configured as follows.

(C1) In a simple planetary reduction gear which includes a simple planetary reduction mechanism including a sun gear, a planetary gear, and an internal gear, and which is connected to a motor and is used in a vertically installed state, the simple planetary reduction mechanism may be disposed at the next step of the motor, the internal gear may be integrated with a casing of the simple planetary reduction mechanism, an air vent port provided in the casing and an air vent passage which causes the air vent port and the upper space of the simple planetary reduction mechanism to communicate with each other may be provided, the casing may be divided into at least a first member and a second member, and the air vent passage may not be directly opened to the upper space of the simple planetary reduction mechanism and may communicate with the upper space of the simple planetary reduction mechanism via the gap between the first member and the second member.

As a result, only air can be substantially introduced from the upper space of the simple planetary reduction mechanism into the air vent port side, and thus, it is possible to decrease the capacity of a buffer tank or remove the buffer tank.

(C2) In this case, the upper space of the simple planetary reduction mechanism may be closed by the cover body of the motor, the first member may be fitted to the cover body via a spigot fitting surface, and the upper space of the simple planetary reduction mechanism may communicate with the gap between the first member and the second member via the gap of the spigot fitting surface.

(C3) A portion between the position positioned further outside in the radial direction than the gap between the first member and the second member of the casing and the cover body of the motor may be closed by a seal member.

(C4) A portion in which the gap between the first member and the cover body is enlarged may be formed on a portion in the circumferential direction of the spigot fitting surface.

(C5) A spring hole accommodating a spring of a brake mechanism of the simple planetary reduction mechanism may be provided in the casing, the air vent passage may be directly opened to the spring hole, and the spring hole may configure a portion of the air vent passage.

(C6) Moreover, a buffer tank which is disposed outside the casing and is connected to the air vent port may be provided.

Applications of certain embodiments of the invention are not limited to the swiveling apparatus of the shovel car, and certain embodiments of the invention may be applied to various simple planetary reduction gears.

It should be understood that the invention is not limited to the above-described embodiment, but may be modified into various forms on the basis of the spirit of the invention. Additionally, the modifications are included in the scope of the invention.

What is claimed is:

1. A simple planetary reduction gear comprising:
   a motor; and
   a simple planetary mechanism including a sun gear which is connected to a motor shaft of the motor, a planetary gear which is supported by a carrier, and an internal gear with which the planetary gear internally meshes,
   wherein the simple planetary reduction gear is used in a vertically installed state,
   wherein the sun gear includes a shaft portion which protrudes to a load side coaxially with a shaft center of the sun gear,
   wherein the shaft portion is supported by a bearing which is disposed between an outer circumference of the shaft portion and an inner circumference of the carrier,
   wherein the internal gear is integrated with a casing of the simple planetary reduction mechanism,
   wherein an air vent port provided in the casing and an air vent passage which causes the air vent port and an upper space of the simple planetary reduction mechanism to communicate with each other are provided,
   wherein the casing is divided into at least a first member and a second member, and
   wherein the air vent passage is not directly opened to the upper space of the simple planetary reduction mechanism and communicates with the upper space of the simple planetary reduction mechanism via a gap between the first member and the second member.

2. The simple planetary reduction gear according to claim 1,
   wherein the sun gear, the planetary gear, and the internal gear are helical gears.

3. The simple planetary reduction gear according to claim 1, further comprising:
   an output member which is separated from the carrier and is connected to the carrier,
   wherein position regulation in an axial direction of an outer ring of the bearing is performed by the output member.

4. The simple planetary reduction gear according to claim 3,
   wherein the output member includes a protrusion which protrudes in the axial direction, the position regulation in the axial direction of the outer ring of the bearing is performed by the protrusion, and the outer circumference of the protrusion is a spigot joint portion between the outer circumference of the protrusion and the inner circumference of the carrier.

5. The simple planetary reduction gear according to claim 1,
wherein a gear portion of the sun gear and the shaft portion are hollow, and a shaft of a drive source side can be inserted into an inside position of the bearing above an inner side of the gear portion.

6. The simple planetary reduction gear according to claim 5,
wherein a spline which connects the inside of the gear portion of the sun gear and the shaft of the drive source side to each other is provided on the inside of the gear portion of the sun gear, and the spline is not formed inside the shaft portion.

7. The simple planetary reduction gear according to claim 1,
wherein an oil level of the simple planetary reduction gear is lower than an upper end position of the sun gear.

8. The simple planetary reduction gear according to claim 3,
wherein the output member includes a large diameter portion and a small diameter portion, and
wherein splines having a same module are formed on the large diameter portion and the small diameter portion.

9. The simple planetary reduction gear according to claim 8, further comprising:
a friction plate of a brake which is disposed in the spline of the large diameter portion,
wherein an outer diameter of the large diameter portion is smaller than the outermost diameter of the carrier.

10. The simple planetary reduction gear according to claim 1, further comprising:
a cover which covers an upper portion of the simple planetary reduction mechanism,
wherein the cover includes a continuous inclined surface which is inclined downward from the outside toward the inside in a radial direction of the sun gear.

11. The simple planetary reduction gear according to claim 10,
wherein a terminal position in the inside in the radial direction of the inclined surface is positioned inside a position of the outermost diameter of the sun gear.

12. The simple planetary reduction gear according to claim 10,
wherein an inner end in the radial direction of a member of a portion configuring the inclined surface is positioned in the inside in the radial direction from an oil seal disposed in the cover.

13. The simple planetary reduction gear according to claim 10,
wherein the inclined surface is also provided at the position at which the cover and the internal gear overlap each other when viewed in the axial direction.

14. The simple planetary reduction gear according to claim 10,
wherein a lubricant passage is provided in a planetary pin which rotatably supports the planetary gear, and either a convex portion or a concave portion is provided in a circumferential direction at a position above the lubricant passage of the cover.

15. The simple planetary reduction gear according to claim 1,
wherein the upper space of the simple planetary reduction mechanism is closed by a cover body of the motor,
wherein the first member is fitted to the cover body via a spigot fitting surface, and
wherein the upper space of the simple planetary reduction mechanism communicates with a gap between the first member and the second member via a gap of the spigot fitting surface.

16. The simple planetary reduction gear according to claim 1,
wherein a portion between the position positioned further outside in the radial direction than the gap between the first member and the second member of the casing and the cover body of the motor is closed by a seal member.

17. The simple planetary reduction gear according to claim 15,
wherein a portion in which the gap between the first member and the cover body is enlarged is formed on a portion in the circumferential direction of the spigot fitting surface.

18. The simple planetary reduction gear according to claim 1,
wherein a spring hole accommodating a spring of a brake mechanism of the simple planetary reduction mechanism is provided in the casing,
wherein the air vent passage is directly opened to the spring hole, and
wherein the spring hole configures a portion of the air vent passage.

19. The simple planetary reduction gear according to claim 1,
wherein a buffer tank which is disposed outside the casing and is connected to the air vent port is provided.

* * * * *